United States Patent
Kim et al.

(10) Patent No.: US 11,424,873 B2
(45) Date of Patent: Aug. 23, 2022

(54) UPLINK CONTROL INFORMATION TRANSMISSION METHOD AND APPARATUS FOR USE IN CELLULAR MOBILE COMMUNICATION SYSTEM

(71) Applicant: Samsung Electronics Co., Ltd., Gyeonggi-do (KR)

(72) Inventors: Youngbum Kim, Seoul (KR); Yongjun Kwak, Gyeonggi-do (KR); Seunghoon Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/841,330

(22) Filed: Apr. 6, 2020

(65) Prior Publication Data

US 2020/0235870 A1    Jul. 23, 2020

Related U.S. Application Data

(63) Continuation of application No. 15/704,870, filed on Sep. 14, 2017, now Pat. No. 10,615,927, which is a (Continued)

(30) Foreign Application Priority Data

Jan. 29, 2014    (KR) .................. 10-2014-0011599

(51) Int. Cl.
*H04L 5/00*        (2006.01)
*H04W 48/00*    (2009.01)
(Continued)

(52) U.S. Cl.
CPC ............. *H04L 5/00* (2013.01); *H04B 7/0626* (2013.01); *H04L 5/0055* (2013.01);
(Continued)

(58) Field of Classification Search
None
See application file for complete search history.

(56) References Cited

U.S. PATENT DOCUMENTS

| | | | |
|---|---|---|---|
| 9,749,963 | B2 | 8/2017 | Hwang |
| 2011/0141928 | A1 | 6/2011 | Shin |

(Continued)

FOREIGN PATENT DOCUMENTS

| | | |
|---|---|---|
| CN | 102812658 | 12/2012 |
| CN | 102884742 | 1/2013 |

(Continued)

OTHER PUBLICATIONS

Chinese Office Action dated Jul. 2, 2021 issued in counterpart application No. 201811055046.8, 13 pages.

(Continued)

*Primary Examiner* — Christopher M Crutchfield
(74) *Attorney, Agent, or Firm* — The Farrell Law Firm, P.C.

(57) ABSTRACT

A communication method and apparatus of a terminal in a mobile communication system are provided. The communication method includes generating uplink control information for at least one activated cell; configuring, if the activated cell belongs to a Master Cell Group (MCG) under a control of a Master evolved Node B (MeNB), an uplink control channel based on the uplink control information of the activated cell belonging to the MCG; and transmitting the uplink control channel to a Primary Cell (PCell).

10 Claims, 19 Drawing Sheets

Related U.S. Application Data continuation of application No. 14/608,916, filed on Jan. 29, 2015, now abandoned.

(51) Int. Cl.
*H04W 52/02* (2009.01)
*H04B 7/06* (2006.01)
*H04W 16/32* (2009.01)

(52) U.S. Cl.
CPC ....... *H04W 48/00* (2013.01); *H04W 52/0212* (2013.01); *H04W 16/32* (2013.01); *Y02D 30/70* (2020.08)

(56) References Cited

U.S. PATENT DOCUMENTS

| | | | |
|---|---|---|---|
| 2011/0249578 | A1 | 10/2011 | Nayeb Nazar et al. |
| 2011/0274043 | A1 | 11/2011 | Nam et al. |
| 2013/0114472 | A1 | 5/2013 | Tamaki et al. |
| 2013/0155898 | A1 | 8/2013 | Yin |
| 2013/0258992 | A1* | 10/2013 | Seo ............... H04W 72/04 370/329 |
| 2013/0279434 | A1* | 10/2013 | Dinan ............. H04L 5/0048 370/329 |
| 2013/0322397 | A1 | 12/2013 | Lee et al. |
| 2013/0329708 | A1 | 12/2013 | Dinan |
| 2013/0343301 | A1 | 12/2013 | Geirhofer et al. |
| 2014/0192775 | A1 | 7/2014 | Li |
| 2014/0198730 | A1 | 7/2014 | Khoshnevis |
| 2014/0247796 | A1* | 9/2014 | Ouchi ............. H04L 5/0053 370/329 |
| 2015/0124743 | A1 | 5/2015 | Damnjanovlc |
| 2015/0156764 | A1 | 6/2015 | Yang |
| 2015/0341156 | A1* | 11/2015 | Yang ............... H04W 52/146 370/280 |
| 2016/0157223 | A1* | 6/2016 | Nogami ........... H04W 72/0446 370/329 |
| 2016/0205579 | A1 | 7/2016 | Cheng |
| 2017/0041865 | A1 | 2/2017 | Takeda |
| 2017/0303212 | A1 | 10/2017 | Takeda |

FOREIGN PATENT DOCUMENTS

| | | |
|---|---|---|
| CN | 103503360 | 1/2014 |
| JP | 2014-1954159 | 4/2016 |
| KR | 1020130127291 | 11/2013 |
| WO | WO 2012/149456 | 11/2012 |

OTHER PUBLICATIONS

Qualcomm Incorporated, "Procedures for Dual Connectivity", R2-134002, 3GPP TSG-RAN2#84, Nov. 11-15, 2013.
NEC Group, "Physical Layer Aspects for Dual Layer Connectivity in Small Cells", R1-133345, 3GPP TSG RAN WG1 Meeting #74, Aug. 19-23, 2013.
NEC, "Discussion on PCell at SeNB in Dual Connectivity", R2-134137, 3GPP TSG RAN2 Meeting #84, Nov. 11-15, 2013.
Huawei, HiSilicon, CATR, "Draft Text Proposal on Physical Layer Support of Dual Connectivity", R1-133918, 3GPP TSG RAN WG1 Meeting #74, Aug. 19-23, 2013.
International Search Report dated Apr. 27, 2015 issued in counterpart application No. PCT/KR2015/000972.
Author Unknown, Control/Timing Issues related to Mixed TDD Configurations in Inter-band CA, 3GPP TSG RAN1 Meeting 66, Doc. No. R1-112213, Aug. 26, 2011, p. 1-4.
Author Unknown, Consideration on Different TDD UL/DL Configurations for Inter-band CA, 3GPP TSG RAN WG1 Meeting No. 66, Doc. No. R1-112474, Aug. 26, 2011, pp. 1-4.
Ericsson, ST-Ericsson, AT&T, "Test Configurations for Verifying CSI for CA", R4-63AH-0109, TTSG-RAN Working Group 4 (Radio) meeting #63AH, Jun. 26-28, 2012, 6 pages.
Czech Technical University In Prague, IAESI, "Dynamic Selection Between D2D and Cellular Mode During D2D", R2-133846, GPP TSG-RAN WG2#84, Nov. 11-15, 2013, 2 pages.
European Search Report dated Jun. 22, 2018 issued in counterpart application No. 18164323.0-1215, 9 pages.
Chinese Office Action dated Apr. 26, 2018 issued in counterpart application No. 201580006218.0, 17 pages.
Panasonic, "The Necessary Functionalities of Pcell Support Towards SeNB", R2-134153, 3GPP TSG-RAN WG2 Meeting #84, Nov. 11-15, 2013, 3 pages.
NSN, Nokia Corporation, "On the Need of PCell Functionality in SeNB", R2-134188, 3GPP TSG-RAN WG2 Meeting #84, Nov. 11-15, 2013, 4 pages.
European Search Report dated Sep. 13, 2017 issued in counterpart application No. 15742931.7-1857, 9 pages.

* cited by examiner

UPLINK CONTROL INFORMATION TRANSMISSION METHOD AND APPARATUS FOR USE IN CELLULAR MOBILE COMMUNICATION SYSTEM

PRIORITY

This application is a Continuation Application of U.S. patent application Ser. No. 15/704,870, which was filed in the United States Patent and Trademark Office on Sep. 14, 2017, which is a Continuation Application of U.S. patent application Ser. No. 14/608,916, which was filed in the United States Patent and Trademark Office on Jan. 29, 2015, and claims priority under 35 U.S.C. § 119(a) to Korean Patent Application No. 10-2014-0011599, which was filed in the Korean Intellectual Property Office on Jan. 29, 2014, the entire content of each of which is incorporated herein by reference.

BACKGROUND OF THE INVENTION

1. Field of the Invention

The present invention relates generally to a cellular mobile communication system and, more particularly, to an uplink control information transmission method and apparatus of a User Equipment (UE) for use in the cellular mobile communication supporting inter-evolved Node B (eNB) carrier aggregation.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive Multiple-input Multiple-Output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, Device-to-Device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and Sliding Window Superposition Coding (SWSC) as an Advanced Coding Modulation (ACM), and Filter Bank Multi Carrier (FBMC), Non-Orthogonal Multiple Access (NOMA), and Sparse Code Multiple Access (SCMA) as an advanced access technology have been developed.

Meanwhile, mobile communication systems have evolved to include high-speed, high-quality wireless packet data communication systems capable of providing data and multimedia services beyond early voice-oriented services.

Recently, standardization organizations, such as the 3$^{rd}$ Generation Partnership Project (3GPP), the 3$^{rd}$ Generation Partnership Project-2 (3GPP2), and the Institute of Electrical and Electronics Engineers (IEEE), have standardized mobile communication systems (e.g., High Speed Downlink Packet Access (HSDPA), Long Term Evolution (LTE), and LTE-Advanced (LTE-A) (3GPP), High Rate Packet Data (HRPD) and Ultra Mobile Broadband (3GPP2), and 802.16e (IEEE)) to meet requirements of high-speed, high-quality wireless packet data communication services.

The LTE system, as a representative example of broadband radio communication systems, uses Orthogonal Frequency Division Multiplexing (OFDM) in downlink communications and Single Carrier Frequency Division Multiple Access (SC-FDMA) in uplink communications. In such a multiple access scheme, the time-frequency resources are allocated to carry user-specific data and control information without overlap (i.e. maintaining orthogonality), so as to distinguish among user-specific data and control information.

FIG. 1 is a diagram illustrating a basic structure of uplink time-frequency resource grid for use in an LTE system.

FIG. 1 shows the basic time-frequency resource grid structure of the radio resource for data and/or control information in the uplink of an LTE system. In the LTE system of FIG. 1, the UpLink (UL) denotes the radio link for a User Equipment (UE) to transmit data and/or control signals to the evolved Node B (eNB), and the DownLink (DL) denotes the radio link for the eNB to transmit data and/or control signals to the UE.

In FIG. 1, the horizontal axis denotes time, and the vertical axis denotes frequency. The smallest transmission unit in the time domain is an SC-FDMA symbol, and, $N_{symb}$ SC-FDMA symbols 102 form a slot 106. Two slots 104 form a subframe, and 10 subframes 105 form a radio frame 107. A slot 106 spans 0.5 ms, a subframe 105 spans 1.0 ms, and a radio frame 107 spans 10 ms. The smallest transmission unit in the frequency domain is a subcarrier.

In the time-frequency domain, the basic resource unit is resource Element (RE) 112, and each RE is defined by one SC-FDMA symbol index and one subcarrier index. A Resource Block (RB) or Physical Resource Block (PRB) 108 is defined by $N_{symb}$ consecutive SC-FDMA symbols in the time domain and $N^{RB}_{SC}$ consecutive subcarriers in the frequency domain. Typically, the smallest data transmission unit is RB 108, and the system transmission band includes $N_{RB}$ RBs. The system transmission band includes $N_{RB} \times N^{RB}_{SC}$ subcarriers. In the LTE system, $N_{symb}=7$ and $N^{RB}_{SC}=12$ in general, but the numbers of symbols and subcarriers included in the RB may change.

Meanwhile, the LTE system may use an Adaptive Modulation and Coding (AMC) scheme and channel sensitive scheduling as techniques for improving the transmission efficiency.

The AMC scheme allows the sender to adjust a transmission data amount in adaptation to channel conditions. For example, when channel conditions are poor, the sender decreases the transmission data rate, so as to maintain the received signal error probability at an intended level. By contrast, when the channel conditions are good, the sender increases the transmission data rate to transmit large amount information efficiently, while maintaining the received signal error probability at an intended level.

Meanwhile, channel sensitive scheduling allows a sender to selectively serve a user having the best channel conditions from among a plurality of users, so as to increase the system throughput, as compared to allocating a channel fixedly to serve a single user. Such an increase of system throughput is referred to as multi-user diversity gain.

The AMC and channel sensitive scheduling are methods of adopting the best modulation and coding scheme at the most efficient times, based on the partial channel state information fed back from the receiver.

When using AMC along with a Multiple Input Multiple Output (MIMO) transmission scheme, it may be necessary to include the function of determining a number of spatial layers or rank and precoder. In this case, the sender determines the optimal data rate, in consideration of the number of layers for use in MIMO transmission, as well as a coding rate and modulation scheme.

In order to support the AMC operation, the UE reports Channel State Information (CSI) to the eNB. The CSI includes at least one of Channel Quality Indicator (CQI), Precoding Matrix Indicator (PMI), and Rank Indicator (RI). The CQI indicates the Signal to Interference and Noise Ratio (SINR) on the whole system band (wideband) or part of the system band (subband). Typically, the CQI is expressed in the form of Modulation and Coding Scheme (MCS) to meet a predetermined data reception performance. The PMI provides the eNB with precoding information necessary for multi-antenna data transmission in the MIMO system. The RI provides the eNB with the rank information necessary for multi-antenna transmission in the MIMO system. The CSI is transmitted by the UE to assist the eNB to make a scheduling decision, but the MCS, precoding, and rank values to be applied for real data transmission are determined by the eNB.

At this time, the UE may transmit the CSI periodically at an interval agreed with the eNB. This is referred to as a 'periodic CSI reporting'. The eNB provides the UE with the control information required for a 'periodic CSI report', such as CSI transmission cycle and CSI transmission resources, in advance. When using periodic CSI reporting, the UE sends, to the eNB, the CSI through an uplink control channel (i.e., a Physical Uplink Control Channel (PUCCH)). In an exceptional case where an uplink data channel (i.e., a Physical Uplink Shared Channel (PUSCH)) must be transmitted at the CSI transmission occasion for the periodic CSI reporting, the UE multiplexes the CSI and the uplink data onto the PUSCH.

Unlike periodic CSI reporting, the eNB may request the UE for 'aperiodic CSI reporting', if necessary. The eNB notifies the UE of the aperiodic CSI reporting request control information through the control channel of scheduling uplink data of the UE. If the aperiodic CSI reporting request is received, the UE reports CSI to the eNB through the PUSCH.

The LTE system adopts Hybrid Automatic Repeat reQuest (HARQ) for retransmission of initial transmission data that has not been successfully decoded. In the HARQ mechanism, if a receiver fails to decode the received data correctly, the receiver sends, to the transmitter, a HARQ Negative Acknowledgement (HARQ NACK) to notify the transmitter of the decoding failure, such that the transmitter retransmits the corresponding data on the physical layer. The receiver combines the retransmitted data and the decoding-failed data to increase the data reception success probability. When the data decoding is successful, the receiver sends, to the transmitter, a HARQ Acknowledgement (HARQ ACK) to request transmission of new data.

The control information, such as HARQ ACK/NACK and CSI, which the UE feeds back to the eNB is called Uplink Control Information (UCI). In the LTE system, the UCI is transmitted to the eNB through a dedicated uplink control channel (i.e., a Physical Uplink Control Channel (PUCCH)). The UCI also may be multiplexed with the data onto a dedicated uplink data channel (i.e., a Physical Uplink Shared Channel (PUSCH)), transmitted to the eNB.

In a broadband wireless communication system, one of the significant factors to provide high-speed wireless data service is bandwidth scalability for dynamic resource allocation. For example, Long Term Evolution (LTE) system can support the bandwidths of 20/15/10/5/3/1.4 MHz. The carriers can provide services with at least one of the bandwidths, and the user equipment can have different capabilities, such that some support only 1.4 MHz bandwidth and others support up to 20 MHz bandwidth.

In an LTE-Advanced (LTE-A) system, aiming to achieve the requirements of the International Mobile Telecommunications (IMT)-Advanced service can provide broadband service by aggregating carriers up to 100 MHz. The LTE-A system needs bandwidth wider than that of LTE systems for high-speed data transmission. Simultaneously, the LTE-A system must be backwards compatible with the LTE system, such that LTE UEs can access the services of the LTE-Advanced system. For this purpose, the entire system bandwidth of the LTE-A system is divided into sub-bands or component carriers that have a bandwidth supporting transmission or reception of the LTE UE and can be aggregated for supporting the high speed data transmission of the LTE-A system in the transmission/reception process of the legacy LTE system per component carrier.

FIG. 2 is a schematic diagram illustrating an LTE-A radio access system supporting carrier aggregation.

FIG. 2 shows an example of an evolved Node B (eNB) that aggregates two component carriers (CC #1 and CC #2) having center frequencies at f1 and f2 respectively. In FIG. 2, the two component carriers CC #1 and CC #2 are configured with respect to the same eNB 102. The eNB 102 has coverage areas 104 and 106 corresponding to the respective component carriers. In an LTE-A system capable of carrier aggregation, the data and control information for the data communication are transmitted per component carrier. The network configuration of FIG. 2 is applicable for uplink carrier aggregation, as well as downlink carrier aggregation.

In the carrier aggregation-enabled system, the component carriers are sorted into a Primary Cell (PCell) and a Secondary Cell (SCell). The PCell is responsible for allocating radio resource to the UE and works as an anchor cell for initial attach and handover of the UE. The PCell is configured with a downlink primary frequency (or Primary Component Carrier (PCC) and an uplink primary frequency. The UE sends the UCI including the control information such as HARQ ACK/NACK and CSI to the eNB through the PUCCH, which is transmitted only in the PCell.

Meanwhile, the SCell is the cell that provides the UE with additional radio resources in addition to the PCell and is configured with a downlink secondary frequency (or Secondary Component Carrier (SCC)) and an uplink secondary frequency, or only with the downlink secondary frequency. Unless otherwise stated, the terms 'cell' and 'component carrier' are used interchangeably.

In the legacy carrier aggregation-enabled LTE-A system, however, the carrier aggregation is limited to intra-eNB carriers.

SUMMARY OF THE INVENTION

The present invention has been made to address at least the above problems and/or disadvantages and to provide at least the advantages described below. Accordingly, an aspect of the present invention provides an uplink control information transmission method of a UE in a mobile communication system.

Another aspect of the present invention provides an uplink control information transmission method and apparatus of a UE that is capable of facilitating inter-eNB carrier aggregation in a mobile communication system.

According to an aspect of the present invention, a communication method of a terminal for use in a mobile communication system is provided. The communication method includes generating uplink control information for at least one activated cell; configuring, if the activated cell belongs to a Master Cell Group (MCG) under a control of a Master evolved Node B (MeNB), an uplink control channel based on the uplink control information of the activated cell belonging to the MCG; and transmitting the uplink control channel to a Primary Cell (PCell).

According to another aspect of the present invention, a communication method of a base station for use in a mobile communication system is provided. The communication method includes determining whether one cell group or a plurality of cell groups are configured with respect to a terminal; and receiving, if the plurality of cell groups are configured with respect to the terminal, uplink control information from/through at least one of a Primary Cell (PCell) and a primary Secondary Cell (pSCell).

According to another aspect of the present invention, a terminal of a mobile communication system is provided. The terminal includes a transceiver configured to transmits and receives signals to and from an evolved Node B (eNB); and a controller configured to control to generate uplink control information for at least one activated cell, configures, if the activated cell belongs to a Master Cell Group (MCG) under a control of a Master eNB (MeNB), an uplink control channel based on the uplink control information of the activated cell belonging to the MCG, and to control the transceiver to transmit the uplink control channel to a Primary Cell (PCell). According to still another aspect of the present invention, a base station of a mobile communication system is provided. The base station includes a transceiver configured to transmit and receive signals to and from a terminal; and a controller configured to determine whether one cell group or a plurality of cell groups are configured with respect to a terminal and to control the transceiver to receive, if the plurality of cell groups are configured with respect to the terminal, uplink control information from/through at least one of a Primary Cell (PCell) and a primary Secondary Cell (pSCell).

According to another aspect of the present invention, a communication method of a terminal for use in a mobile communication system is provided. A communication method is provided for a terminal in a mobile communication system. The communication method includes acquiring information for configuring at least one of a first cell group and a second cell group; receiving scheduling information on a first subframe of the first cell group, the scheduling information comprising a channel state information (CST) request; acquiring aperiodic CSI for a first cell, wherein the first cell is one cell among at least one cell of the first cell group and the first cell is identified based on the scheduling information; acquiring periodic CSI for a second cell of the second cell group; and transmitting the aperiodic CSI for the first cell on a second subframe of the first cell in response to the CSI request and transmitting the periodic CSI for the second cell on a third subframe of the second cell, if the first cell group and the second cell group are different cell group.

BRIEF DESCRIPTION OF THE DRAWINGS

The above and other aspects, features and advantages of the present invention will be more apparent from the following detailed description, taken in conjunction with the accompanying drawings, in which.

DETAILED DESCRIPTION OF EMBODIMENTS OF THE PRESENT INVENTION

Figure 1:
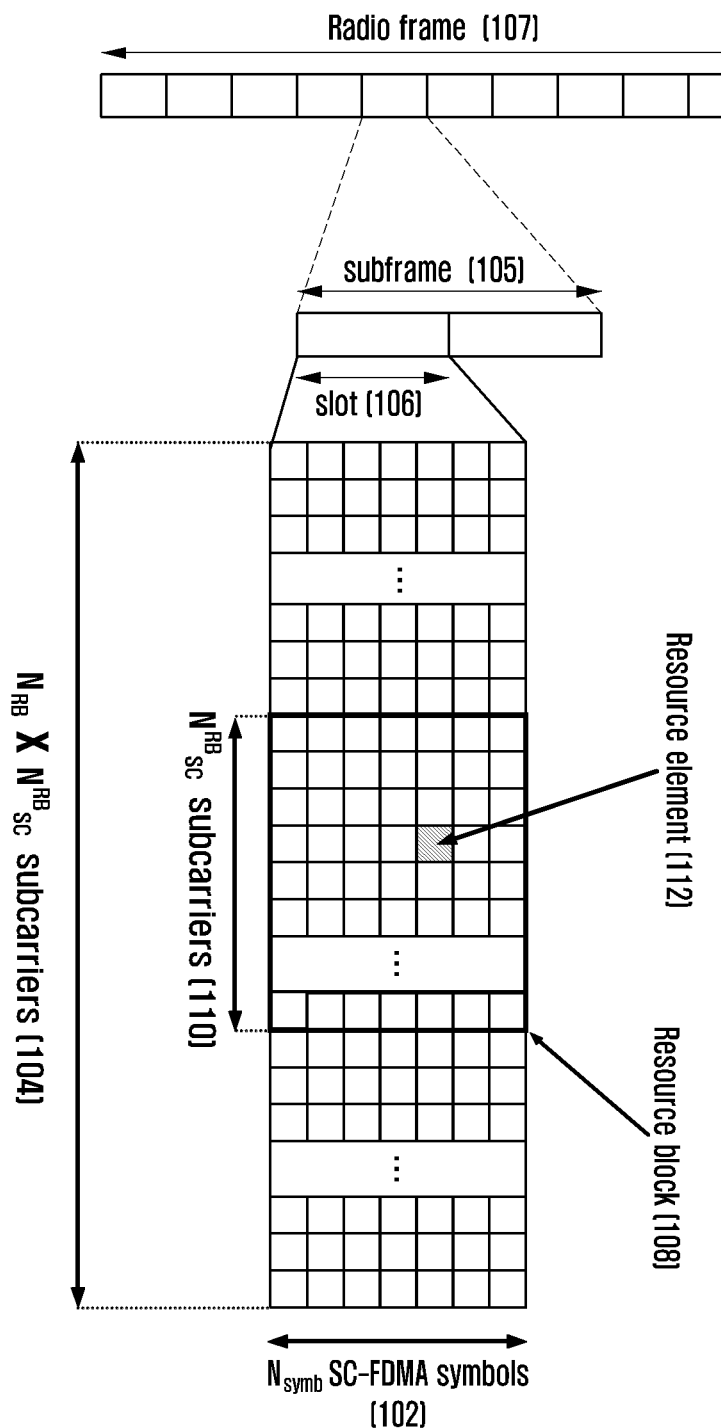
FIG. 1 is a diagram illustrating a basic structure of uplink time-frequency resource grid for use in an LTE system.

Hereinafter, embodiments of the present invention are described with reference to the accompanying drawings in detail. The same or similar components may be designated by the same or similar reference numerals although they are illustrated in different drawings. Detailed descriptions of constructions or processes known in the art may be omitted to avoid obscuring the subject matter of the present invention.

In the following description, a base station is an entity that allocates resources to terminals, and may be any of, for example, an evolved Node B (eNode B or eNB), a Node B, a Base Station (BS), a radio access unit, a base station controller, or a network node.

The terminal may be any of, for example, User Equipment (UE), a Mobile Station (MS), a cellular phone, a smartphone, a computer, or multimedia system equipped with a communication function. Although the following description refers to Evolved-Universal Terrestrial Radio Access (E-UTRA) or LTE and Advance E-UTRA or LTE-A systems, embodiments of the present invention can be applied even to other communication systems having similar technical backgrounds and channel formats, with a slight modification, without departing from the spirit and scope of embodiments of the present invention.

An embodiment of the present invention provides an uplink control information transmission method of a UE in an inter-eNB carrier aggregation-enabled LTE-A system.

An example of a system architecture of the inter-eNB carrier aggregation-enabled LTE-A system according to an embodiment of the present invention is described as follows.

Figure 3:
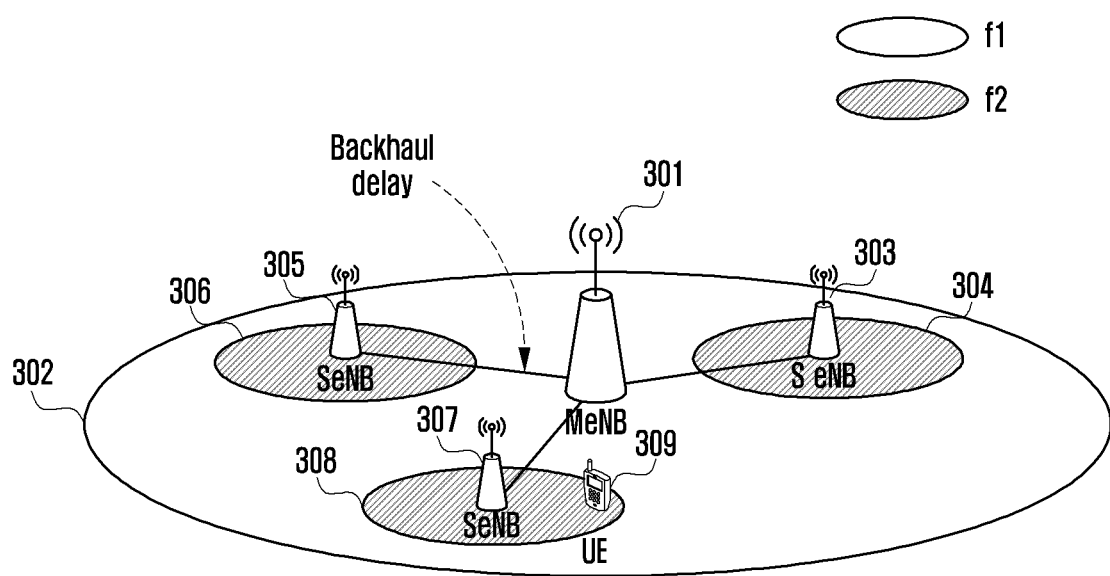
FIG. 3 is a diagram illustrating an example of a system architecture of an inter-eNB carrier aggregation-enabled LTE-A system according to an embodiment of the present invention.

FIG. 3 is a diagram illustrating an example of a system architecture of the inter-eNB carrier aggregation-enabled LTE-A system according to an embodiment of the present invention.

FIG. 3 shows an example of a system in which a plurality pico eNBs 303, 305, and 307 having small coverage areas are distributed within the coverage 302 of a macro eNB 301. Typically, a macro eNB transmits signals at a power level greater than that of a pico eNB. The macro eNB 301 and the pico eNBs 303, 305, and 307 are connected each other with a certain amount of backhaul delay. Accordingly, according to some embodiments of the present invention, delay-sensitive information is not exchanged between macro and pico eNBs.

Although the following description of embodiments of the present invention refers to carrier aggregation between macro eNB 301 and pico eNBs 303, 305, and 307, the present invention is not limited thereto, but can be applied for the carrier aggregation between geographically-remote eNBs. For example, embodiments of the present invention can be applied to carrier aggregation between two geographically-remote macro eNBs and between two geographically-remote pico eNBs. Also, there is no limit in the number of carriers to be aggregated.

The embodiment of FIG. 3 is directed to a case where the macro eNB 301 uses frequency f1 for downlink signal transmission, and the pico eNBs 303, 305, and 307 use frequency f2 for downlink transmission. The macro eNB 301 transmits data or control information to the UE 309 through the frequency f1, and the pico eNBs 303, 305, and 307 transmit data or control information to the UE 309 through the frequency f2. Through carrier aggregation, multiple eNBs can transmit signals to the UE simultaneously through multiple frequencies, resulting in an improvement of peak data rate and system throughput. In the environment shown and described with reference to FIG. 3, the UE operation of communicating with the macro eNB 301 and the pico eNBs 303, 305, and 307 is called Dual Connectivity (DC).

The network configuration of FIG. 3 can be applied to uplink carrier aggregation as well as downlink carrier aggregation. For example, the UE 309 may transmit data or control information to the macro eNB 301 through frequency f1'. The UE 309 may also transmit data and control information to the pico eNBs 303, 305, and 307 through f2'. The frequency f1' corresponds to the frequency f1, and the frequency f2' corresponds to frequency f2.

Figure 2:
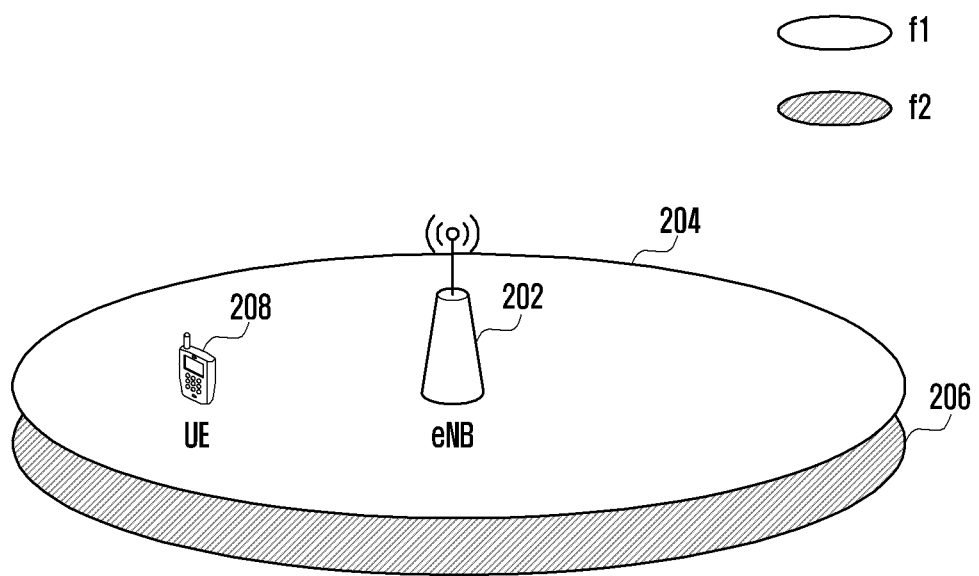
FIG. 2 is a diagram illustrating an LTE-A radio access system supporting carrier aggregation.

When it is necessary for the UE to transmit uplink control information corresponding to the respective cells to the eNB through PUCCH in the intra-eNB carrier aggregation system shown in FIG. 2, the UE configures one PUCCH corresponding to multiple cells which is transmitted through a predetermined uplink component carrier (e.g., PCell). In this case, it is possible to maintain the consistency of the UE and eNB operations for delivering the uplink control information from the UE to the eNB independently of the uplink carrier aggregation capability of the UE. Since the aggregated cells are under the control of one eNB, the eNB is able to acquire the uplink control informations for the respective cells from the PUCCH transmitted by the UE through a single uplink component carrier and schedules the cells based thereon from the viewpoint of the eNB without any problems.

When using the inter-eNB carrier aggregation system of FIG. 3 (assuming that there are two eNBs, i.e. eNB A and eNB B, involved in the inter-eNB carrier aggregation), if the uplink control information transmission is limited to one uplink component carrier, the eNB A receiving the uplink control information through the uplink component carrier may use only the uplink control information of its own uplink component carrier(s) but not the uplink control information of the uplink component carrier(s) of the eNB B. Therefore, there is a need for a procedure for transmitting the uplink control information of the uplink component carrier(s) of the eNB B from the eNB A to the eNB B through a backhaul. In this case, the backhaul delay makes difficult to schedule the cells under the control of the eNB B, resulting in degradation of system efficiency.

A procedure for transmitting eNB-specific uplink control informations from the UE to the eNBs in the inter-eNB carrier aggregation system is described in detail later herein. Certain terms used frequently in the following description of embodiments of present invention are defined below.

Dual Connectivity (DC): Operation in which a UE attaches to multiple eNBs (e.g., Master eNB (MeNB) and Secondary eNB (SeNB)) to use their radio resources and there is some backhaul delay between the MeNB and SeNB.

MeNB: eNB that acts as a mobility anchor for UE in DC mode.

SeNB: eNB providing additional radio resources for the UE in DC mode, i.e., an eNB that is not an MeNB.

Master Cell Group (MCG): Group of serving cells associated with the MeNB, which includes one PCell and one or more SCells.

Secondary Cell Group (SCG): Group of serving cells associated with SeNB that includes one pSCell and one or more SCells.

primary Secondary cell (pSCell): Cell for PUCCH transmission of a UE among the SCells associated with an SeNB FIG. 4 is a signal flow diagram illustrating a control information transmission procedure according to an embodiment of the present invention.

Figure 4:
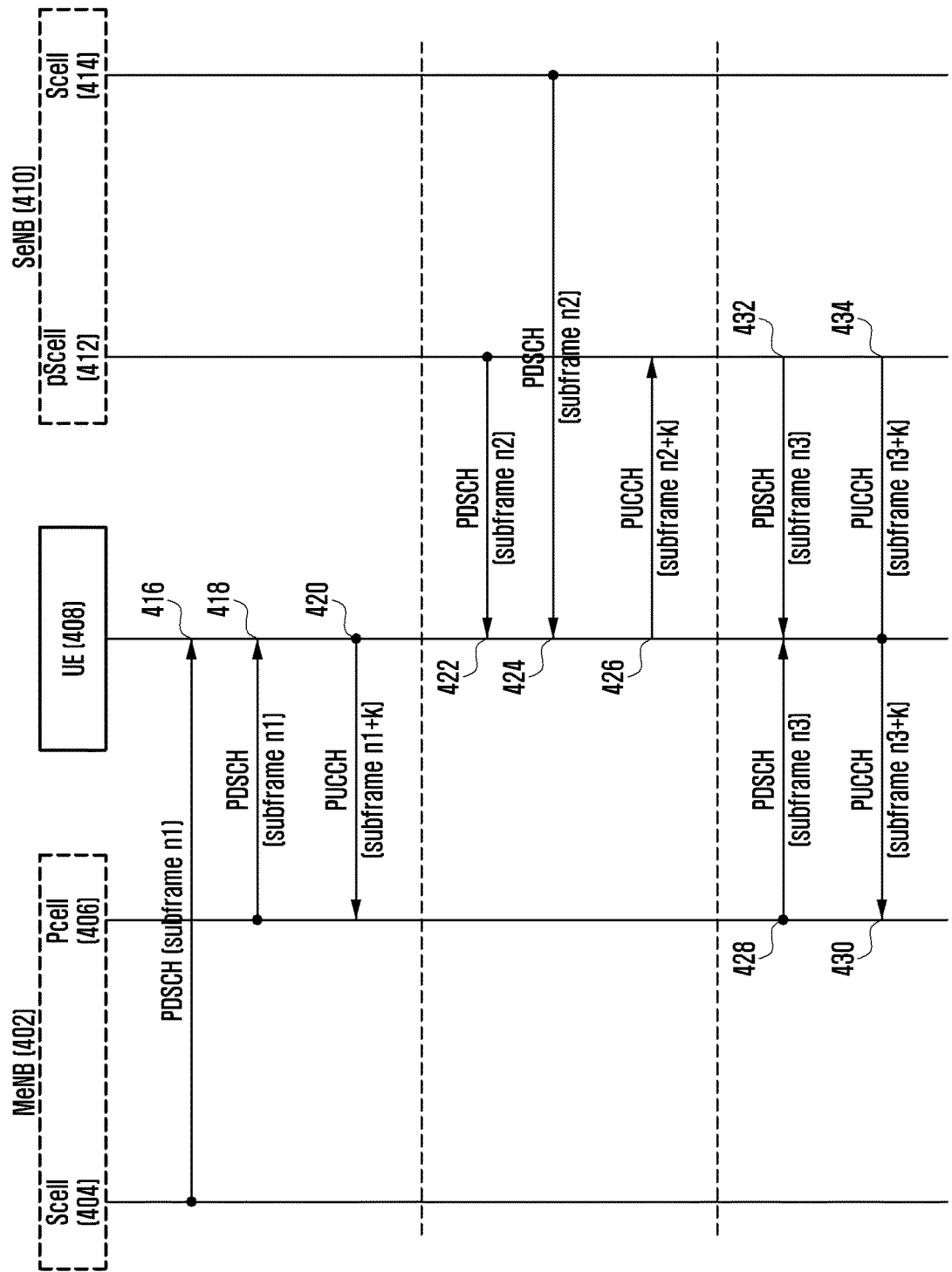
FIG. 4 is a signal flow diagram illustrating a control information transmission procedure according to an embodiment of the present invention.

Referring to FIG. 4, the UE 408 may transmit HARQ ACK/NACK as eNB-specific uplink control information on a PUCCH in a DC operation. In FIG. 4, the control information transmission is performed in the inter-eNB carrier aggregation system as shown in FIG. 3. FIG. 4 is directed to an example in which the MeNB 402 controls the PCell 406 and the SCell 404, and in which the SeNB 410 controls the pSCell 412 and the SCell 414.

In a first scenario according to FIG. 4, the UE 408 receives PDSCHs from the cells under the control of the MeNB 402 at a certain time point. In this case, the UE 408 sends the PCell 406 of the MeNB 402 the HARQ ACK/NACKs corresponding to the PDSCHs on PCell PUCCH. For example, the UE 408 receives a PDSCH from the SCell 404 of the MeNB 402 at subframe #n1, at step 416, and another PDSCH from the PCell 406 of the MeNB 402 at subframe #n1, at step 418. Then, the UE 408 sends the PCell 406 of the MeNB 402 the HARQ ACK/NACKs corresponding to the PDSCHs received from the PCell 406 and SCell 404 of the MeNB 402 on the PCell PUCCH at subframe #n1+k, at step 420. Here, k denotes a number of subframes for securing the time necessary for PDSCH reception/decoding and HARQ ACK/NACK generation of the UE. For example, k is set to a value corresponding to 4 subframes.

In a second scenario according to FIG. 4, the UE 408 receives PDSCHs from the cells under the control of the SeNB 410 at a certain time point. In this case, the UE 408 sends the pSCell 412 of the SeNB 410 the HARQ ACK/NACKs corresponding to the PDSCHs on the pSCell PDCCH. For example, the UE 408 receives a PDSCH from the pSCell 412 of the SeNB 410 at subframe #n2, at step 422, and another PDSCH from the from the SCell 414 of the SeNB 410 at subframe #n2, at step 424. Then, the UE 408 sends the pSCell 412 of the SeNB 410 the HARQ ACK/NACKs corresponding to the PDSCHs received from the pSCell 412 and SCell 414 on the pSCell PUCCH at subframe #n2+k, at step 426. Here, k denotes a number of subframes for securing the time necessary for PDSCH reception/decoding and HARQ ACK/NACK generation of the UE. The value k may be set to a value corresponding to 4 subframes.

In third scenario according to FIG. 4, the UE 408 receives PDSCHs from a cell under the control of the MeNB 402 and a cell under the control of the SeNB 410 at a certain time point. In this case, the UE 408 sends the PCell 406 of the MeNB 408 the HARQ ACK/NACK corresponding to the PDSCH received from the MeNB 402 on the PCell PUCCH and sends the pSCell 412 of the SeNB 410 the HARQ ACK/NACK corresponding to the PDSCH received from the SeNB 410 on the pSCell PUCCH. For example, the UE 408 receives a PDSCH from the PCell 406 of the MeNB 402 at subframe #n3, at step 428, and another PDSCH from the pSCell 412 of the SeNB 410 at subframe #n3, at step 432. Then the UE 408 sends the PCell 406 of the MeNB 402 the HARQ ACK/NACK corresponding to the PDSCH received from the PCell 406 on the PCell PUCCH at subframe #n3+k, at step 430, and sends the pSCell 434 of the SeNB 410 the HARQ ACK/NACK corresponding to the PDSCH received from the pSCell 412 on the pSCell PUCCH at subframe #n3+k, at step 434.

Uplink control information transmission methods according to the embodiments of the present invention are described hereinafter in detail.

First Embodiment

A first embodiment of the present invention is directed to a method for a UE to transmit HARQ ACK/NACK on PUCCH in the system supporting inter-eNB carrier aggregation between the first and second eNBs. In the following example, the first eNB is the MeNB and the second eNB is the SeNB.

A UE-side procedure of HARQ ACK/NACK transmission method according to the first embodiment of the present invention is described with reference to FIG. 5.

Figure 5:
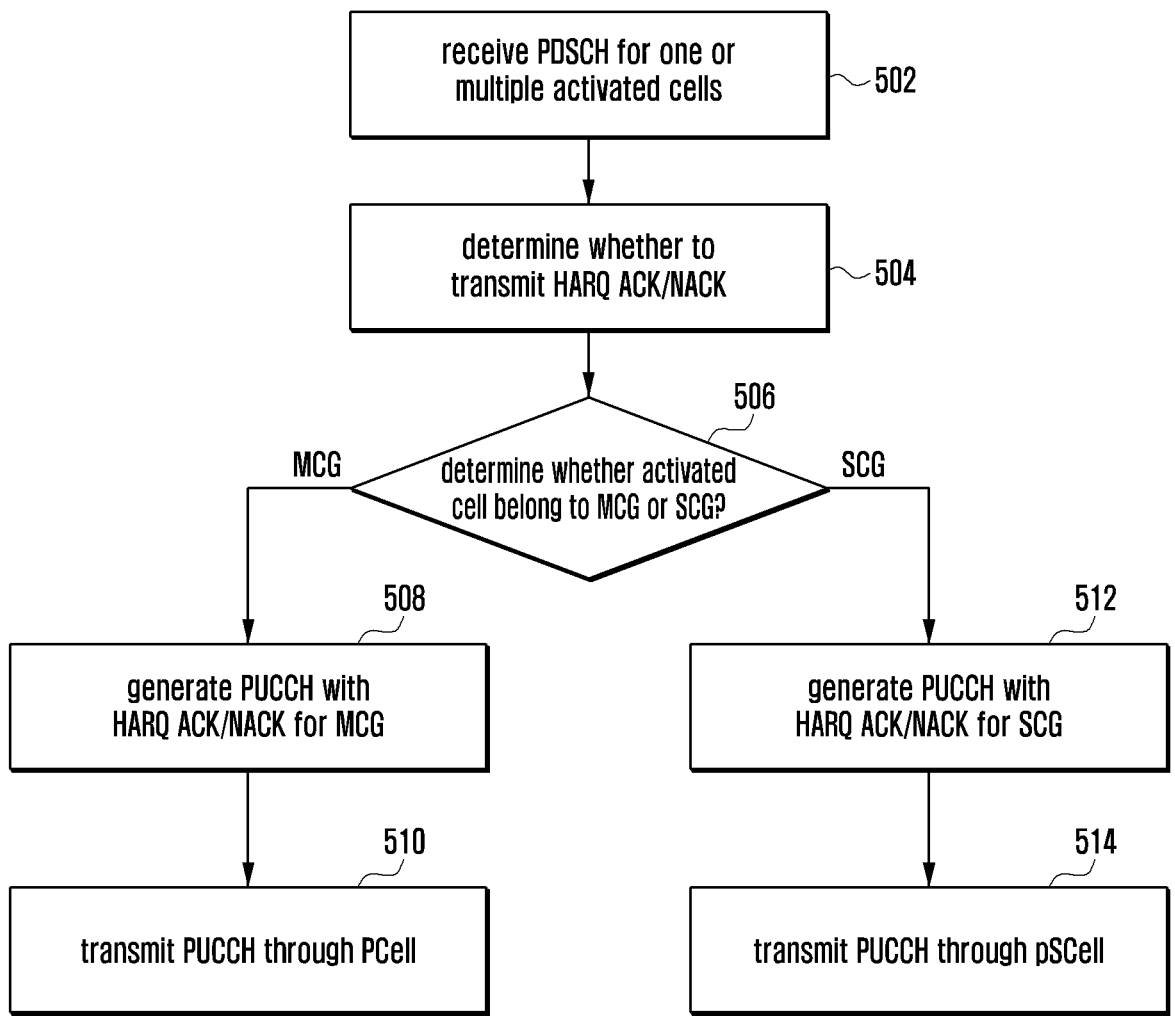
FIG. 5 is a flowchart illustrating a UE-side procedure of a HARQ ACK/NACK transmission method according to a first embodiment of the present invention.

FIG. 5 is a flowchart illustrating a UE-side procedure of a HARQ ACK/NACK transmission method according to the first embodiment of the present invention.

Referring to FIG. 5, the UE receives a PDSCH from at least one activated cell of the first and second eNBs, at step 502. The eNBs deactivate the SCells with the exception of the PCell and pSCell. At this time, the UE receives data and control information through the activated cell other than the deactivated cell, in order to reduce power consumption.

Next, the UE decodes the received PDSCH(s) to determine whether to transmit HARQ ACK/NACK, at step 504. The UE determines whether the activated cell in which the PDSCH(s) is received belongs to the MCG or the SCG, at step 506.

If the activated cell belongs to the MCG, the UE generates a PUCCH with the HARQ ACK/NACK for the activated cell of the MCG, at step 508. Then, the UE transmits the PUCCH to the PCell, at step 510.

Otherwise, if the activated cell belongs to the SCG, the UE generates a PUCCH with the HARQ ACK/NACK for the activated cell of the SCG, at step 512. Then, the UE transmits the PUCCH to the pSCell, at step 514.

If it is determined that the activated cell includes an MCG cell and an SCG cell, at step 506, the UE performs all of the operations of steps 508, 510, 512, and 514.

According to an alternative embodiment of the present invention, step 506 may precede step 502.

Figure 6:
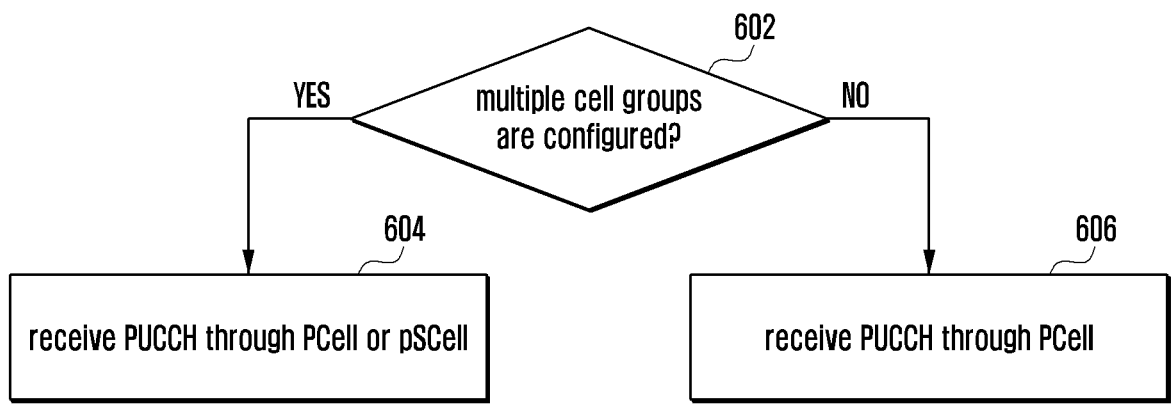
FIG. 6 is a flowchart illustrating a eNB-side procedure of the HARQ ACK/NACK transmission method according to the first embodiment of the present invention.

An eNB-side procedure of a HARQ ACK/NACK transmission method according to the first embodiment of the present invention is described herein with reference to FIG. 6.

FIG. 6 is a flowchart illustrating the eNB-side procedure of the HARQ ACK/NACK transmission method according to the first embodiment of the present invention.

Referring to FIG. 6, the first and second eNBs determine whether they have configured multiple cell groups including one MCG and at least one SCG to a UE, at step 602.

If the first and second eNBs have configured the multiple cell groups to the UE, the first eNB receives a PUCCH from the UE through the PCell and the second eNB receives a PUCCH from the UE through the pSCell, at step 604.

If the first and second eNBs have not configured multiple cell groups to the UE, the first eNB receives a PUCCH through the PCell, but the second eNB does not receive a PUCCH from the UE.

The first embodiment of the present invention may be modified in various ways. Examples of embodiments of the present invention modified from the first embodiment of the present invention are described hereinafter with reference to FIGS. 7 and 8.

Figure 7:
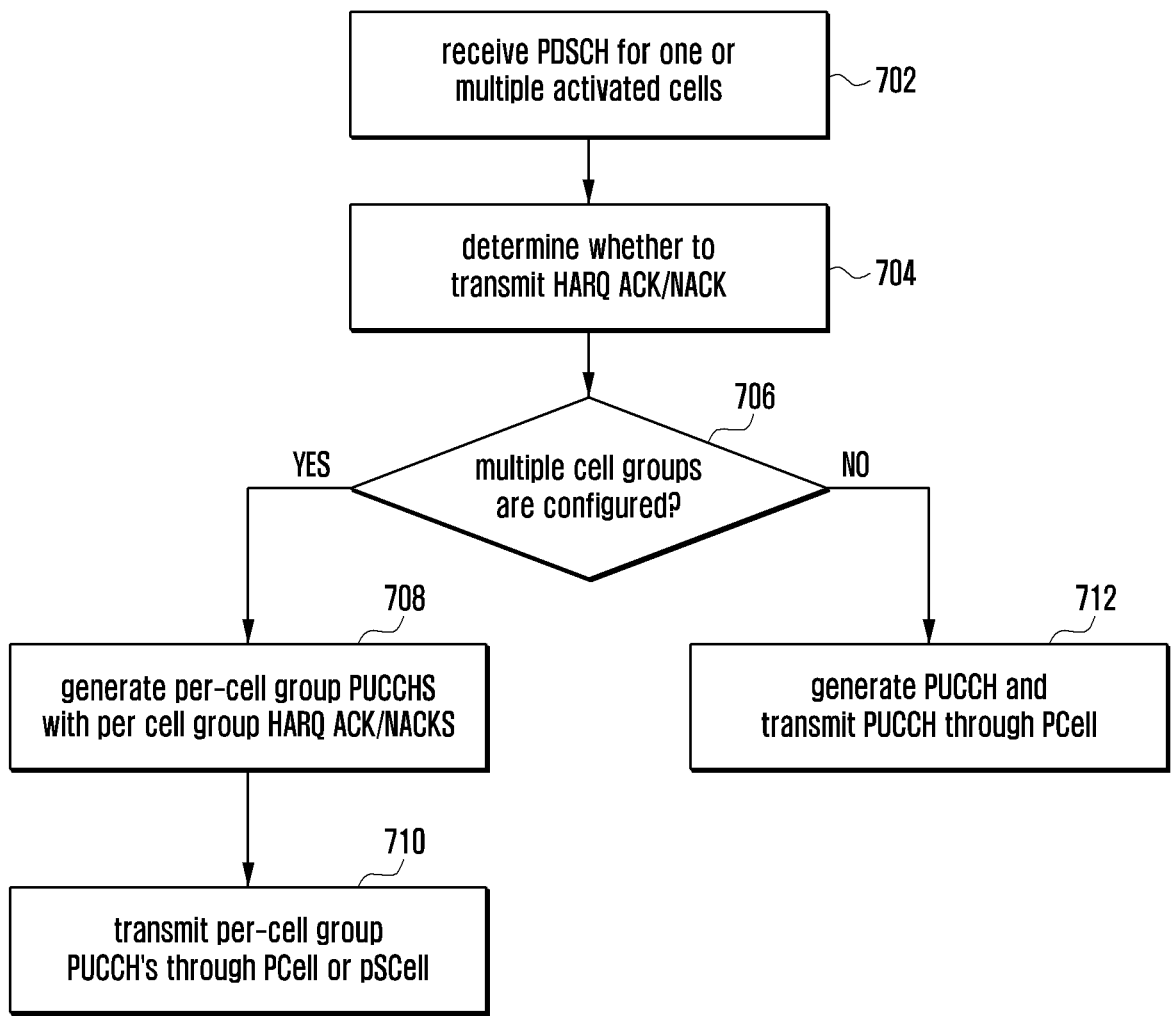
FIG. 7 is a flowchart illustrating the UE-side procedure according to an alternative embodiment of the present invention modified from the first embodiment of the present invention.

FIG. 7 is a flowchart illustrating a UE-side procedure according to an alternative embodiment of the present invention modified from the first embodiment of the present invention.

Referring to FIG. 7, the UE receives PDSCH(s) from at least one activated cell of the first and second eNBs, at step 702. The UE decodes the received PDSCH(s) to determine whether to transmit HARQ ACK/NACK, at step 704.

Next, the UE determines whether multiple cell groups including MCG and SCG are configured, at step 706.

If it is determined that multiple cell groups are configured, the UE generates per-cell group PUCCHs with per-cell group HARQ ACK/NACKs, at step 708. Then, the UE transmits the MCG PUCCH through the PCell and the SCG PUCCH through the pSCell, at step 710.

If it is determined that one cell group is configured at step 706, the UE generates a PUCCH with the HARQ ACK/NACK corresponding to the received PDSCH and transmits the PUCCH through the PCell, at step 712.

Figure 8:
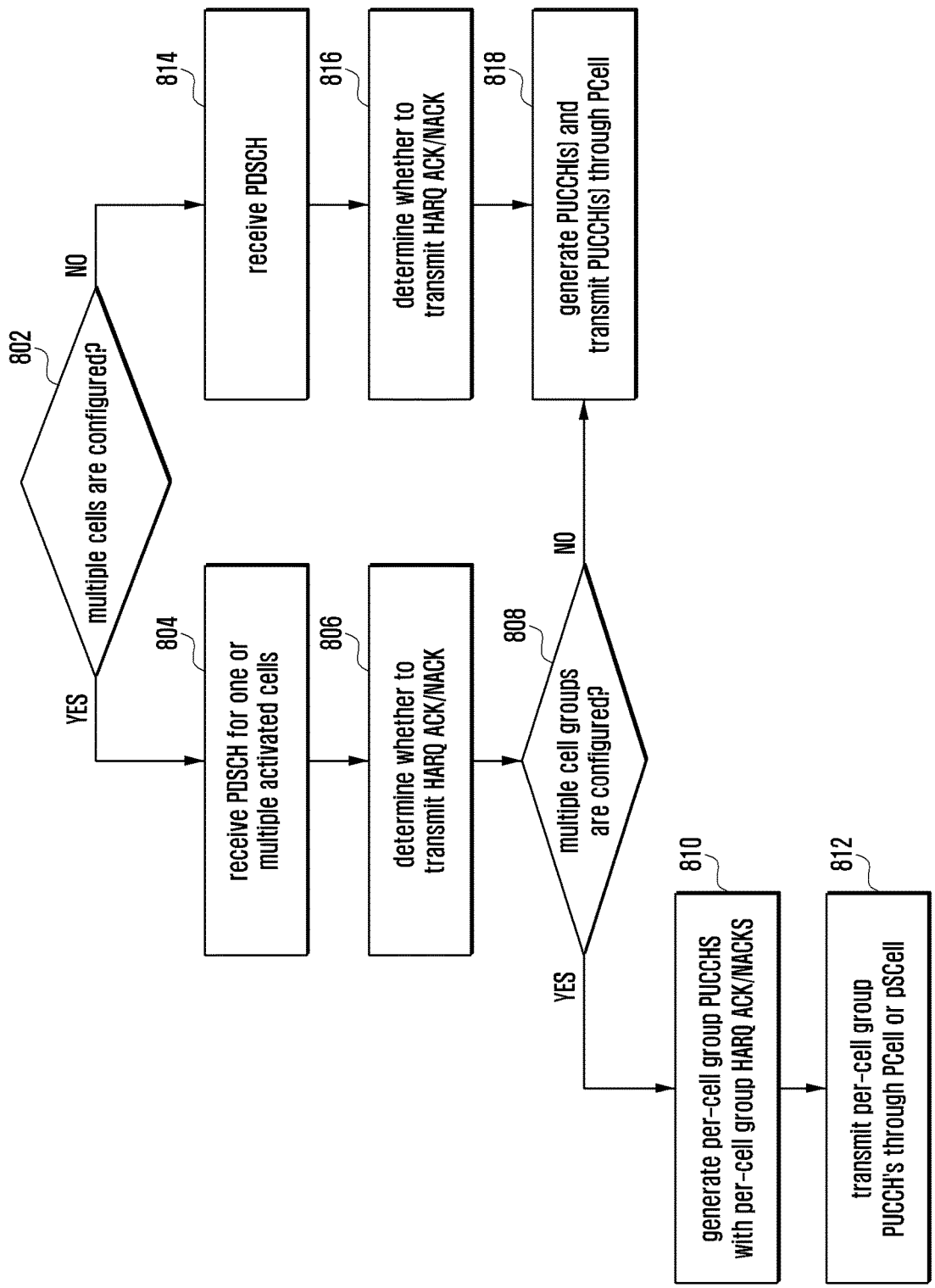
FIG. 8 is a flowchart illustrating a UE-side procedure according to an alternative embodiment of the present invention modified from the first embodiment of the present invention.

FIG. 8 is a flowchart illustrating a UE-side procedure according to an alternative embodiment of the present invention modified from the first embodiment of the present invention.

Referring to FIG. 8, the UE determines whether multiple cells are configured by eNB(s), at step 802. The multiple cells may belong to the same eNB or to different eNBs.

If it is determined that only one cell is configured, the UE receives PDSCH from the corresponding cell, at step 814. Then, the UE decodes the received PDSCH to determine whether to transmit HARQ ACK/NACK, at step 816. The UE generates PUCCH with HARQ ACK/NACK and transmits the PUCCH to the PCell at step 818.

If it is determined that multiple cells are configured at step 802, the UE receives PDSCH(s) from at least one activated cell of the first and second eNBs, at step 804. Then the eNB decodes the received PDSCH(s) to determine whether to transmit HARQ ACK/NACKs, at step 806. Next, the UE determines whether multiple cell groups (including MCG and SCG) are configured by the eNBs, at step 808.

If it is determined that multiple cell groups are configured, the UE generates per-cell group PUCCHs with per-cell group HARQ ACK/NACKs, at step 810. Next, the UE transmits the MCG PUCCH to the PCell and the SCG PUCCH to the pSCell, at step 812.

If it is determined that one cell group is configured, at step 808, the UE generates PUCCHs with HARQ ACK/NACKs corresponding to the received PDSCHs and transmits the PUCCHs to the PCell, at step 818.

Second Embodiment

The second embodiment of the present invention is directed to a method for a UE to transmit a CSI on PUCCH in a system supporting inter-eNB carrier aggregation between the first and second eNBs. It is assumed that the first eNB is the MeNB and the second eNB is the SeNB.

A UE-side procedure of a CSI transmission method according to the second embodiment of the present invention is described with reference to FIG. 9.

Figure 9:
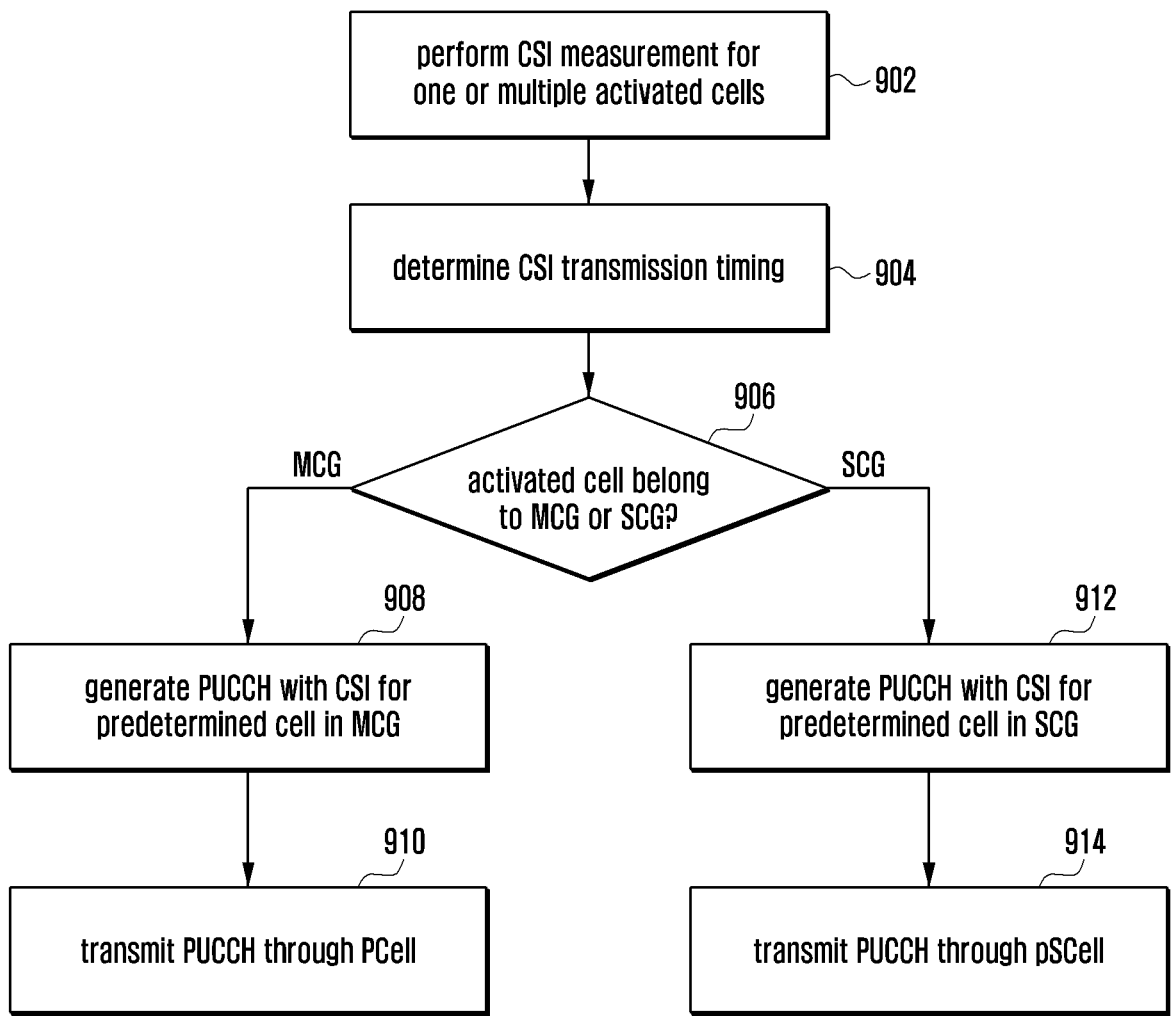
FIG. 9 is a flowchart illustrating a UE-side procedure of a CSI transmission method according to a second embodiment of the present invention.

FIG. 9 is a flowchart illustrating the UE-side procedure of the CSI transmission method according to the second embodiment of the present invention.

Referring to FIG. 9, the UE performs CSI measurement on at least one activated cell of the first and second eNBs, at step 902.

The UE determines the CSI transmission timings for the respective activated cells, at step 904. At this time, the eNB may send the UE the control information related to CSI transmission in advance in order for the UE to determine the CSI transmission timing based on the control information. According to an alternative embodiment of the present invention, step 904 precedes step 902. More specifically, the CSI transmission timing for the activated cells may be determined before CSI measurement on the activated cells.

Afterward, the UE determines whether the activated cell to which the UE transmits the CSI belongs to the MCG or the SCG, at step 906.

If the activated cell to which the UE transmits the CSI belongs to the MCG, the UE generates a PUCCH with the CSI for the activated cell of the MCG at step 908. If the CSI transmission timings of a plurality of activated cells of the MCG are overlapped, the UE generates the PUCCH with the CSI of one activated cell selected based on a priority of RI, PMI, wideband CQI, and subband CQI according to the CSI type. For example, if the CSI of the activated cell is RI and the CSI of the activated cell B is wideband CQI, the UE may transmit the RI of the activated cell A but drop the wideband CQI of the activated cell B. If the CSI types of the activated cells A and B are equal in priority, the UE may transmit the CSI of the activated cell having the lower cell index.

The UE transmits the PUCCH to the PCell, at step 910.

If the activated cell to which the UE transmits the CSI belongs to the SCG, the UE generates PUCCH with the CSI of the activated cell of the SCG, at step 912. If the CSI transmission timings of a plurality of activated cells of the SCG are overlapped, the UE generates the PUCCH with the CSI of one activated cell selected based on the CSI type cell index as described with reference to step 908. A further detailed description thereof is therefore omitted herein for clarity and conciseness.

The UE transmits the generated PUCCH to the pSCell, at step 914.

If it is determined that the activated cells include the MCG and SCG cells, at step 906, the UE performs all of the operations of steps 908, 910, 912, and 914.

More specifically, the UE transmits the CSI for the activated cell of the MCG and the CSI for the activated cell of the SCG at the same time. However, the UE cannot transmit the CSIs for the active cells of the MCG or the SCG at the same time.

According to an alternative embodiment of the present invention, step 906 may precede step 904.

The eNB-side procedure of the CSI transmission method according to the second embodiment of the present invention is identical to the eNB-side procedure according to the first embodiment of the present invention. Therefore, a further detailed description of the eNB-side procedure of the CSI transmission message is omitted herein for clarity and conciseness.

The second embodiment of the present invention may be modified in various ways. Certain embodiments of the present invention modified from the second embodiment of the present invention are described hereinafter with reference to FIGS. 10 and 11.

Figure 10:
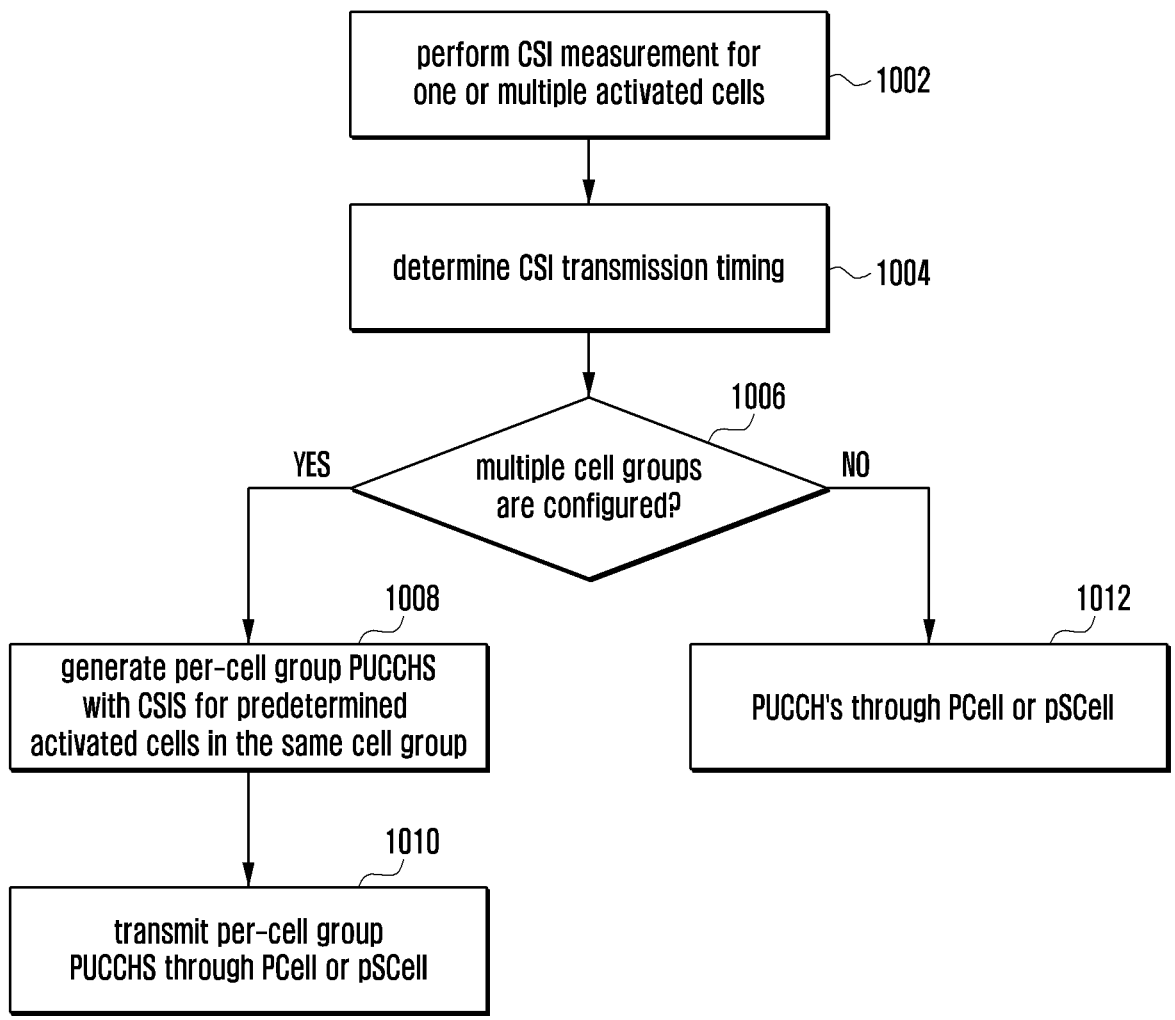
FIG. 10 is a flowchart illustrating the UE-side procedure according to an alternative embodiment of the present invention modified from the second embodiment of the present invention.

FIG. 10 is a flowchart illustrating the UE-side procedure according to an alternative embodiment of the present invention modified from the second embodiment of the present invention.

Referring to FIG. 10, the UE performs CSI measurement on one or more activated cells of the first and second eNBs at step 1002.

The UE determines the CSI transmission timings for the respective activated cells at step 1004. At this time, the eNB may send the UE the control information related to CSI transmission in advance in order for the UE to determine the CSI transmission timing based on the control information. According to certain alternative embodiments of the present invention, step 1004 may precede step 1002.

Afterward, the UE determines whether multiple cell groups including MCG and SCG are configured at step 1006. According to certain embodiments of the present invention, step 1006 may precede step 1002 or 1004.

If multiple cell groups are configured, the UE generates per-cell group PUCCHs with CSIs for predetermined activated cell in the same cell group, at step 1008. As described with reference to step 908, the UE may determine the activated cell belonging to MCG or SCG for generating PUCCH with the corresponding CSI.

The UE transmits the MCG PUCCH to the PCell and the SCG PUCCH to the pSCell, at step 1010.

If it is determined that one cell group is configured, at step 1006, the UE generates PUCCH with the CSI for one configured cell and transmits the PUCCH to the PCell, at step 1012.

Figure 11:
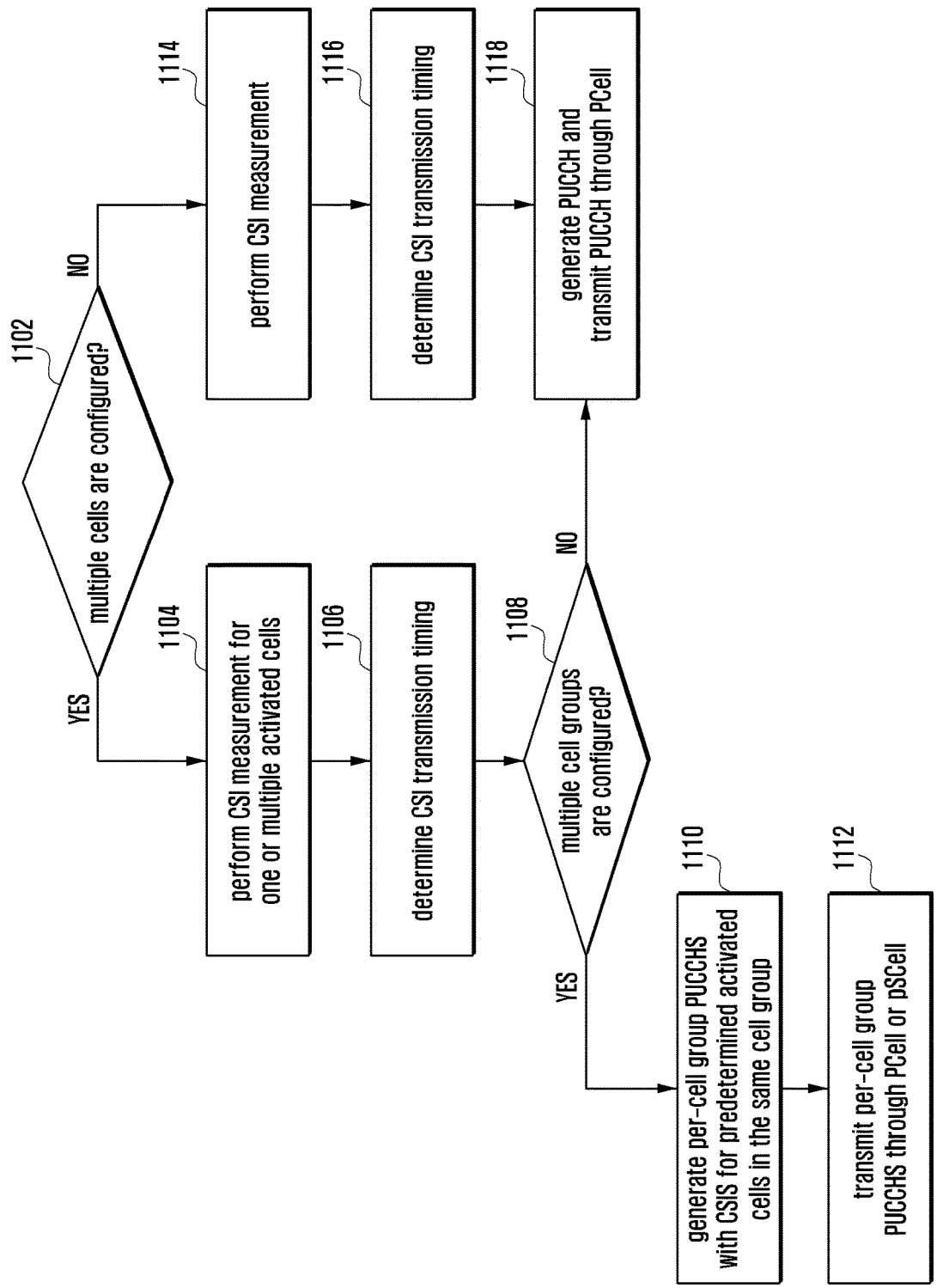
FIG. 11 is a flowchart illustrating the UE-side procedure according to another alternative embodiment of the present invention modified from the second embodiment of the present invention.

FIG. 11 is a flowchart illustrating a UE-side procedure according to another alternative embodiment of the present invention modified from the second embodiment of the present invention.

Referring to FIG. 11, the UE determines whether multiple cells are configured by eNB(s), at step 1102. The multiple cells may belong to the same eNB or different eNBs.

If it is determined that a single cell is configured, the UE performs CSI measurement on the corresponding cell, at step 1114. The UE determines the transmission timing of the measured CSI, at step 1116. Then the UE generates PUCCH with the CSI and transmits the PUCCH to the PCell, at step 1118.

If it is determined that multiple cells are configured at step 1102, the UE performs CSI measurement on at least one activated cell, at step 1104. Next, the UE determines the transmission timings of the measured CSIs, at step 1106. The UE determines whether multiple cell groups (including MCG and SCG) are configured by the eNBs, at step 1108.

If multiple cell groups are configured, the UE generates per-cell group PUCCHs with CSIs for predetermined activated cells in the same cell group, at step 1110. The activated cell (of MCG or SCG) of which CSI is to be configured onto a PUCCH is determined based on the CSI type and cell index as described herein with reference to step 908 of FIG. 9. Then, the UE transmits the MCG PUCCH to the PCell and the SCG PUCCH to the pSCell.

If it is determined that one cell group is configured, at step 1108, the UE generates PUCCH with the CSI for one configured cell and transmits the PUCCH to the PCell, at step 1118.

Third Embodiment

The third embodiment of the present invention is directed to a method for the UE to transmit HARQ ACK/NACK on PUCCH in the system supporting inter-eNB carrier aggregation between the first and second eNBs. It is assumed that the first eNB is the MeNB and the second eNB is the SeNB.

A UE-side procedure of the HARQ ACK/NACK transmission method according to the third embodiment of the present invention is described with reference to FIG. 12.

Figure 12:
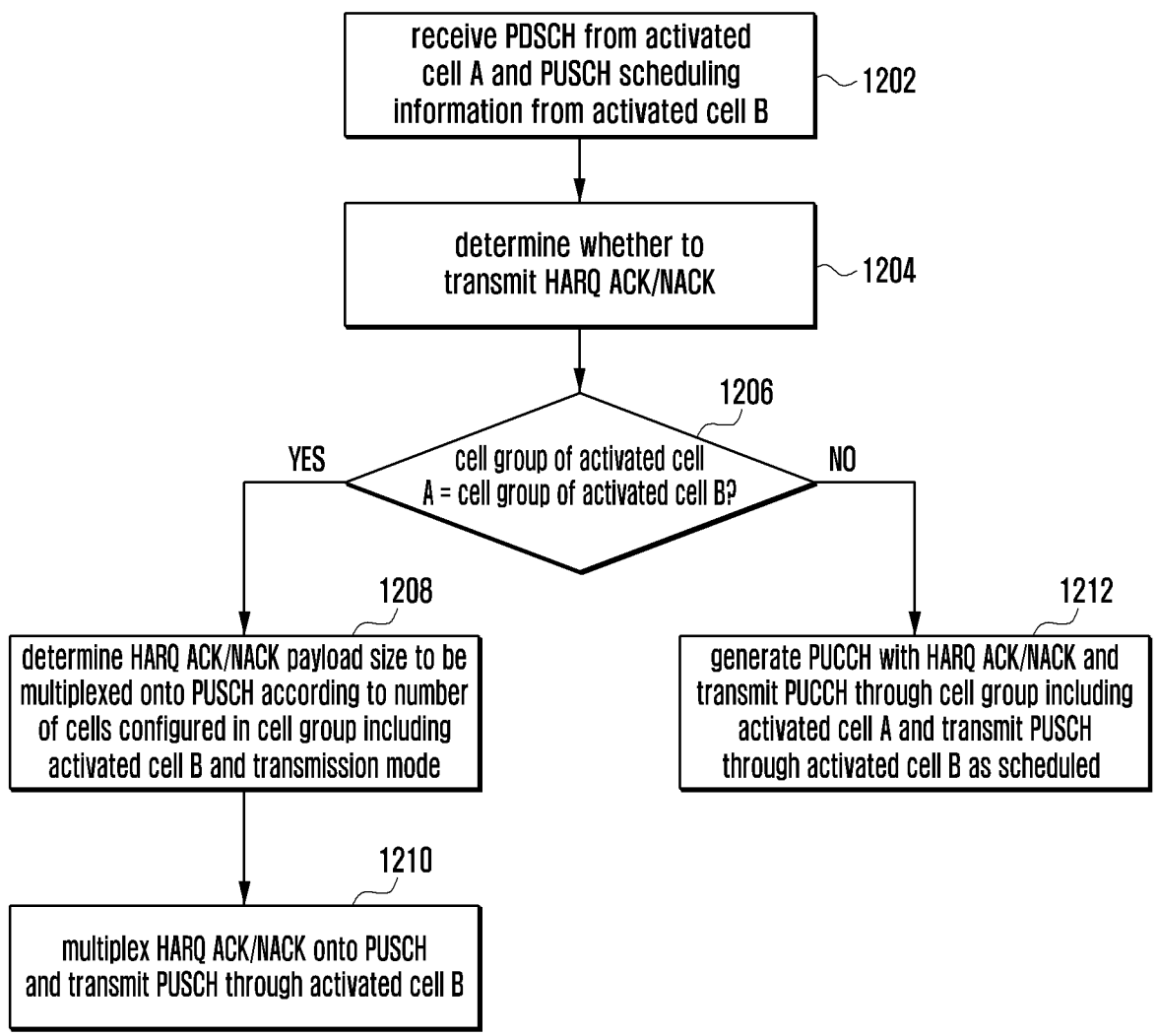
FIG. 12 is a flowchart illustrating the UE-side procedure of the HARQ ACK/NACK transmission method according to a third embodiment of the present invention.

FIG. 12 is a flowchart illustrating the UE-side procedure of the HARQ ACK/NACK transmission method according to the third embodiment of the present invention.

Referring to FIG. 12, the UE receives a PDSCH from the activated cell A and PUSCH scheduling information from the activated cell B, at step 1202. The PUSCH scheduling information is the control information including the resource allocation information and MCS information necessary for PUSCH transmission of the UE. The PUSCH scheduling information is received from the eNB through the PUCCH. In the present example, the transmission timing of the HARQ ACK/NACK corresponding to the PDSCH and the transmission timing of PUSCH based on the scheduling information received through PUSCH are identical to each other.

The UE decodes the received PDSCH to determine whether to transmit HARQ ACK/NACK, at step 1204. Next, the UE determines whether the cell group of the activated cell A and the cell group of the activated cell B are identical with each other, at step 1206.

If the cell groups of the activated cells A and B are identical with each other, the UE determines the HARQ ACK/NACK payload size to be applied to the transmission of the HARQ ACK/NACK corresponding to the PDSCH of the activated cell to be multiplexed on the PUSCH of the activated cell B according to the number of cells configured in the cell group of the activated cell B and the transmission mode at step 1208.

At this time, the number of cells configured in the cell group for the terminal is set to a value according to the determination of the eNB. The eNB determines the number of activated cells to be configured in the cell group in the range of the number of cells configured in the cell group. At this time, the number of cells, which is determined in the range of the number of cell configured in the cell group, is a value changing less frequently than the number of activated cells. Accordingly, using the number of cells configured in the cell group as the criterion for determining the HARQ ACK/NACK payload size of the UE, it is possible to reduce any misunderstanding about the HARQ ACK/NACK payload between the eNB and the UE.

The transmission mode is determined depending on whether MIMO transmission is enabled. In view of the HARQ ACK/NACK of the UE, the MIMO transmission mode requires a 2-bit HARQ ACK/NACK corresponding to two codewords. Meanwhile, the non-MIMO transmission mode requires a 1-bit HARQ ACK/NACK corresponding to one codeword. Accordingly, assuming the number of cells configured for the MIMO transmission mode is C2 and the number of cells configured for the non-MIMO transmission mode is C1 (N=C1+C2), the HARQ ACK/NACK payload size of the UE becomes (C1+C2)*2.

Afterward, the UE multiplexes the HARQ ACK/NACK corresponding to the PDSCH of the activated cell A onto the PUSCH of the activated cell B and transmits the PUSCH to the activated cell B, at step 1210.

If it is determined that the cell groups of the activated cells A and B are different from each other, at step 1206, the UE generates a PUCCH with the HARQ ACK/NACK corresponding to the PDSCH of the activated cell A and transmits the PUCCH to the cell group of the activated cell A and transmits the PUSCH, as scheduled, to the activated cell B, at step 1212.

If the PDSCH transmission and PUSCH scheduling are performed simultaneously in the cell group of the activated cell A, and if the PDSCH transmission and PUSCH scheduling are performed simultaneously in the cell group of the activated cell B, the UE multiplexes the HARQ ACK/NACK corresponding to the PDSCH transmitted in the cell group of the activated cell A onto the PUSCH of the cell group of the activated cell A and multiplexes the HARQ ACK/NACK corresponding to the PDSCH transmitted in the cell group of the activated cell B onto the PUSCH of the cell group of the activated cell B.

Fourth Embodiment

The fourth embodiment of the present invention is directed to a method for the UE to transmit a periodic CSI on a PUSCH in a system supporting inter-eNB carrier aggregation between the first and second eNBs. In the present example, the first eNB is the MeNB and the second eNB is the SeNB.

A UE-side procedure of a periodic CSI transmission method according to the fourth embodiment of the present invention is described as follows with reference to FIG. 13.

Figure 13:
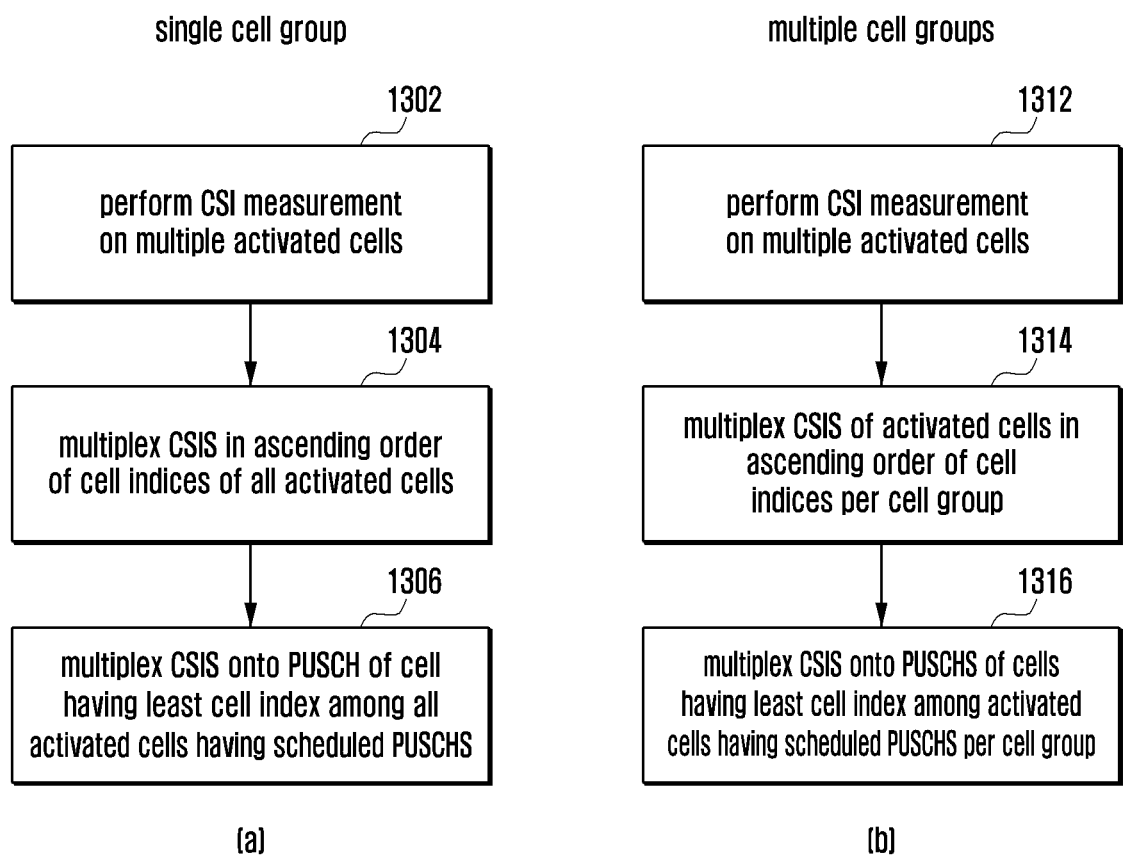
FIG. 13 is flowcharts illustrating the UE-side procedure of the periodic CSI transmission method according to a fourth embodiment of the present invention.

FIG. 13 is a flowchart illustrating the UE-side procedure of the periodic CSI transmission method according to the fourth embodiment of the present invention.

In the fourth embodiment of the present invention, it is assumed that the PUSCH transmission timing and multiple periodic CSI report timings overlap.

Referring to part (a) of FIG. 13, if a single cell group is configured with respect to the UE, the UE performs CSI measurement on multiple activated cells for which the periodic CSI repotting transmission timings are overlapped, at step 1302.

Next, the UE multiplexes the CSIs for the multiple activated cells in an ascending order of their cell indices, at step 1304.

Then the UE multiplexes the CSIs onto the PUSCH of the cell having the least cell index among all of the activated cells having the scheduled PUSCHs, at step 1306.

Referring to part (b) of FIG. 13, if multiple cell groups are configured with respect to the UE, the UE performs CSI measurement on the multiple activated cells of which periodic CSI reporting transmission timings are overlapped, at step 1312.

Next, the UE multiplexes the CSIs of the activated cells in an ascending order of the cell indices per cell group, at step 1314. Then the UE multiplexes the CSIs onto PUSCHs of the cells having the least cell index among activated cells having the scheduled PUSCHs per cell group, at step 1316.

Figure 14:
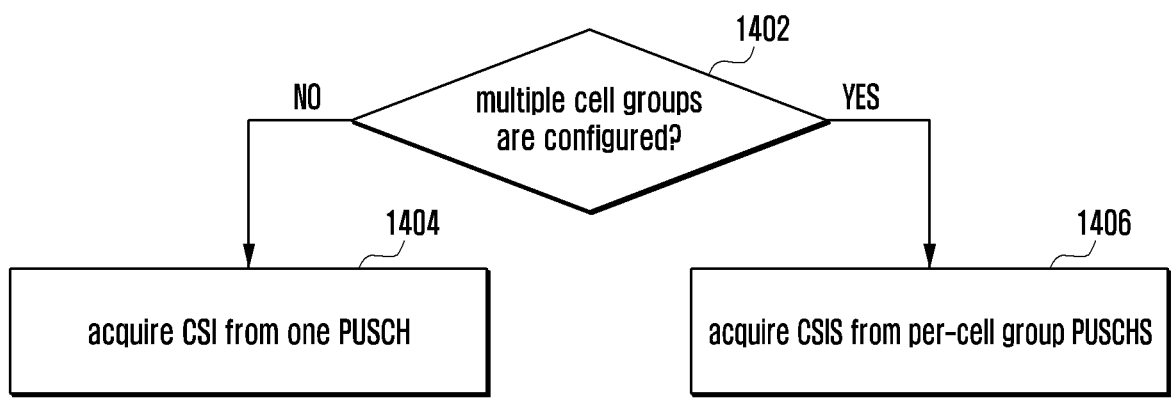
FIG. 14 is a flowchart illustrating the eNB-side procedure of the periodic CSI transmission method according to the fourth embodiment of the present invention.

FIG. 14 is a flowchart illustrating an eNB-side procedure of the periodic CSI transmission method according to the fourth embodiment of the present invention.

Referring to FIG. 14, an eNB determines whether multiple cell groups are configured with respect to the UE, at step 1402. It is possible to determine whether multiple cell groups are configured through exchange of cell group configuration information for the UE between the first and second eNBs.

If a single cell group is configured, the eNB managing the corresponding cell group acquires the CSI(s) from the PUSCH of a cell of the corresponding cell group, at step 1404.

If multiple cell groups are configured, the eNB acquires CSIs from the per-cell group PUSCHs, at step 1406. If multiple PUSCHs are scheduled in one cell group, the eNB may receive the CSIs from the PUSCH of the cell having the least cell index.

Fifth Embodiment

The fifth embodiment of the present invention is directed to a UE-side operation when periodic CSI report timing and aperiodic CSI report timing are overlapped in the system supporting inter-eNB carrier aggregation between the first and second eNBs. In the present example, the first eNB is the MeNB and the second eNB is the SeNB.

A UE-side procedure of a CSI transmission method according to the fifth embodiment of the present invention is described with reference to FIG. 15.

Figure 15:
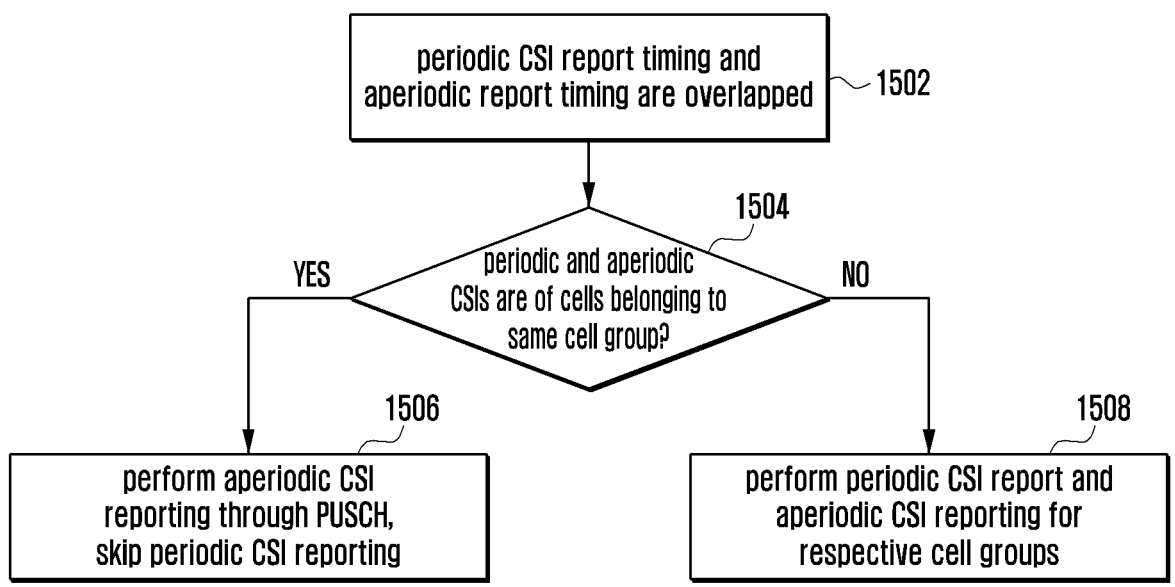
FIG. 15 is a flowchart illustrating the UE-side procedure of the CSI transmission method according to a fifth embodiment of the present invention.

FIG. 15 is a flowchart illustrating the UE-side procedure of the CSI transmission method according to the fifth embodiment of the present invention.

Referring to FIG. 15, the UE determines that a periodic CSI report timing and an aperiodic CSI report timing are overlapped, at step 1502. The UE may determine the periodic CSI report timing based on the CSI transmission control information previously transmitted by the eNB. The aperiodic CSI report timing occurs after a predetermined time (e.g., 4 subframes) since the CSI report command has been transmitted from the eNB to the UE.

Next, the UE determines whether the periodic CSI report and aperiodic CSI report are the CSI reports for the same cell group, at step 1504.

If the periodic CSI reporting and aperiodic CSI reporting are scheduled for the same cell group, the UE performs aperiodic CSI reporting through the PUSCH as scheduled by the eNB and skips the periodic CSI reporting at step 1506.

If it is determined that the periodic CSI reporting and the aperiodic CSI reporting are scheduled for different cell groups, at step 1504, the UE performs the periodic CSI reporting and the aperiodic CSI reporting to the respective cell groups, at step 1508.

Sixth Embodiment

The sixth embodiment of the present invention is directed to a UE-side procedure when multiple aperiodic CSI reporting commands are received in the system supporting inter-eNB carrier aggregation between the first and second eNBs. In the present example, the first eNB is the MeNB and the second eNB is the SeNB.

The UE-side procedure of the aperiodic CSI transmission method according to the sixth embodiment of the present invention is described with reference to FIG. 16.

Figure 16:
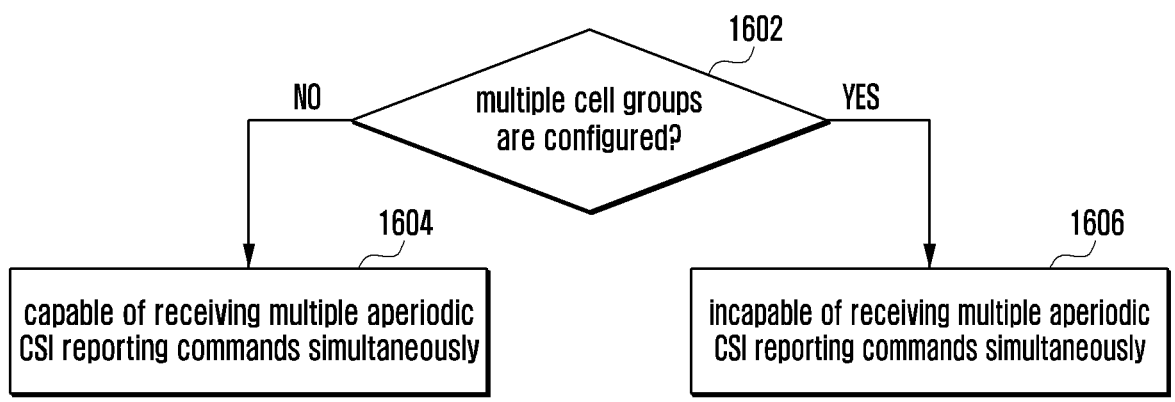
FIG. 16 is a flowchart illustrating the UE-side procedure of the aperiodic CSI transmission method according to a sixth embodiment of the present invention.

FIG. 16 is a flowchart illustrating the UE-side procedure of the aperiodic CSI transmission method according to the sixth embodiment of the present invention.

Referring to FIG. 16, the UE determines whether multiple cell groups are configured with respect to the UE, at step 1602.

If multiple cell groups are configured with respect to the UE, the UE may receive aperiodic CSI reporting commands for the activated cells belonging to different cell groups at step 1604. That is, the UE may receive the aperiodic CSI reporting command for the activated cell of the MCG and the aperiodic CSI reporting command for the activated cell of the SCG simultaneously from the MeNB and SeNB.

If a single cell group is configured with respect to the UE, the UE does not receive multiple aperiodic CSI reporting commands at step 1606.

Seventh Embodiment

The seventh embodiment of the present invention is directed to a method for the UE to determine transmit powers per-eNB PUCCH in a system supporting inter-eNB carrier aggregation between the first and second eNBs. In the present example, the first eNB is the MeNB and the second eNB is the SeNB.

The PUCCH transmit power $P_{PUCCH}(i, c)$ at subframe i of cell c is determined by Equation (1), as follows:

$$P_{PUCCH}(i,c) = \min\{P_{CMAX}(c) - P_{O\_PUCCH}(c) + PL(c) + h(n_{CSI}, n_{HARQ}, n_{SR}, c) + \Delta_{F\_PUCCH}(F,c) + \Delta_{TxD}(F',c) + g(i,c)\} \quad (1)$$

In Equation (1):

$P_{CMAX}(c)$: Maximum allowed UE transmit power for cell c which is determined based on UE power class and higher layer signaling configuration $P_{O\_PUCCH}(c)$: UL interference compensation value which the eNB measures for cell c and signals to UE.

PL(c): Pathloss between eNB and UE in cell c which is difference between transmit power of Reference Signal (RS) transmitted by eNB and received signal strength level of RS at UE.

$h(n_{CSI}, n_{HARQ}, n_{SR}, c)$: Offset value determined based on control signal of PUCCH to be transmitted by UE in cell c. If the control information is the CSI for a predetermined cell of the cell group including cell c, $n_{CQI}$ is determined based on the number of bits of the CSI for the corresponding cell. If the control information is the Scheduling Request (SR) for the cell group including cell c, $n_{SR}$ is determined based on the number of bits of the SR. If the control information is the HARQ ACK/NACK for a predetermined cell of the cell group including cell c, $n_{HARQ}$ is determined as follows:

$$n_{HARQ} = \sum_{c=0}^{N_{cells}^{DL}-1} N_c^{received}$$

(here, $N_{cells}^{DL}$ denotes a number of cells configured in the cell group including cell c, and $N_c^{received}$ denotes a number of Transport Blocks (TBs) received in the cell group including cell c at subframe #(i-4).)

$\Delta_{F\_PUCCH}(F,c)$: Offset configured by eNB depending on whether control information which the UE wants to transmit on PUCCH for cell c is HARQ ACK/NACK, CSI, or SR, and signaled to the UE.

$\Delta_{TxD}(F',c)$: Value determined through higher layer signaling according to whether transmit diversity is applied to PUCCH of cell c.

g(i,c): Value calculated based on power control command for cell c which is included in the PDSCH scheduling information or group power control information for subframe i in the cell group including cell c from the eNB.

When transmitting a HARQ ACK/NACK through PUCCH, the UE determines UL radio resources for PUCCH transmission at subframe i of cell c in at least one reference cell (e.g., PCell and pSCell) in the cell group including the cell c and transmits the PUSCH at the transmit power calculated by equation (1). For example, if the UE received PDSCHs from the respective PCell of the MCG and pSCell of the SCG, the UE determines the PUCCH radio resource for PCell based on the PDCCH scheduling the PDSCH of the PCell and the PUCCH radio resource for pSCell based on the PDCCH scheduling PDSCH of the pSCell. More specifically, the UE determines the PUCCH radio resource for HARQ ACK/NACK transmission based on at least one PDCCH received through the same cell group as the PUCCH but ignores the PDCCH received through other cell group in determining PUCCH radio resource determination.

When transmitting CSI through PUCCH, the UE may determine the CSI transmission radio resource signaled by the eNB in advance for the cell group including the cell c as the UL radio resource for PUCCH transmission at subframe i of the cell c and transmit the PUCCH at the transmit power calculated by Equation (1).

Figure 17:
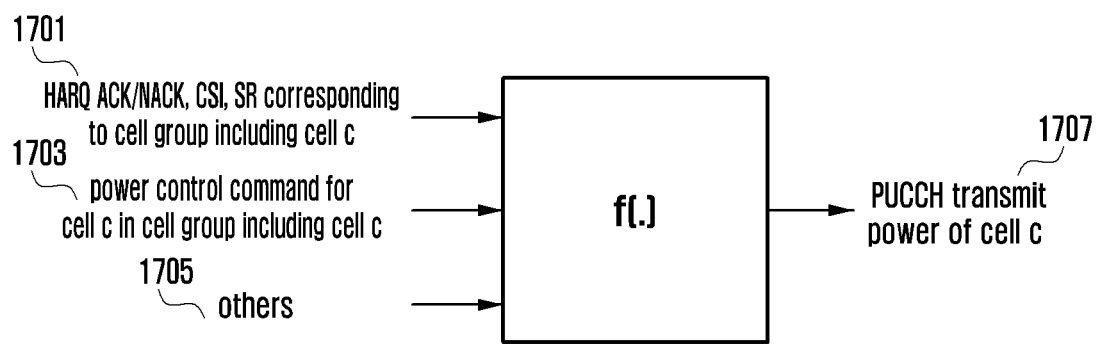
FIG. 17 is a diagram illustrating a concept of a PUCCH transmit power determination method according to a seventh embodiment of the present invention.

FIG. 17 is a diagram illustrating a concept of a PUCCH transmit power determination method according to the seventh embodiment of the present invention.

Referring to FIG. 17, the PUCCH transmit power 1707 for cell c is determined based on HARQ ACK/NACKs, CSIs, and SRs 1701 for the cells in the cell group including the cell c and the power control commands 1703 for the cells in the cell group including the cell c, and other parameters 1705.

Figure 18:
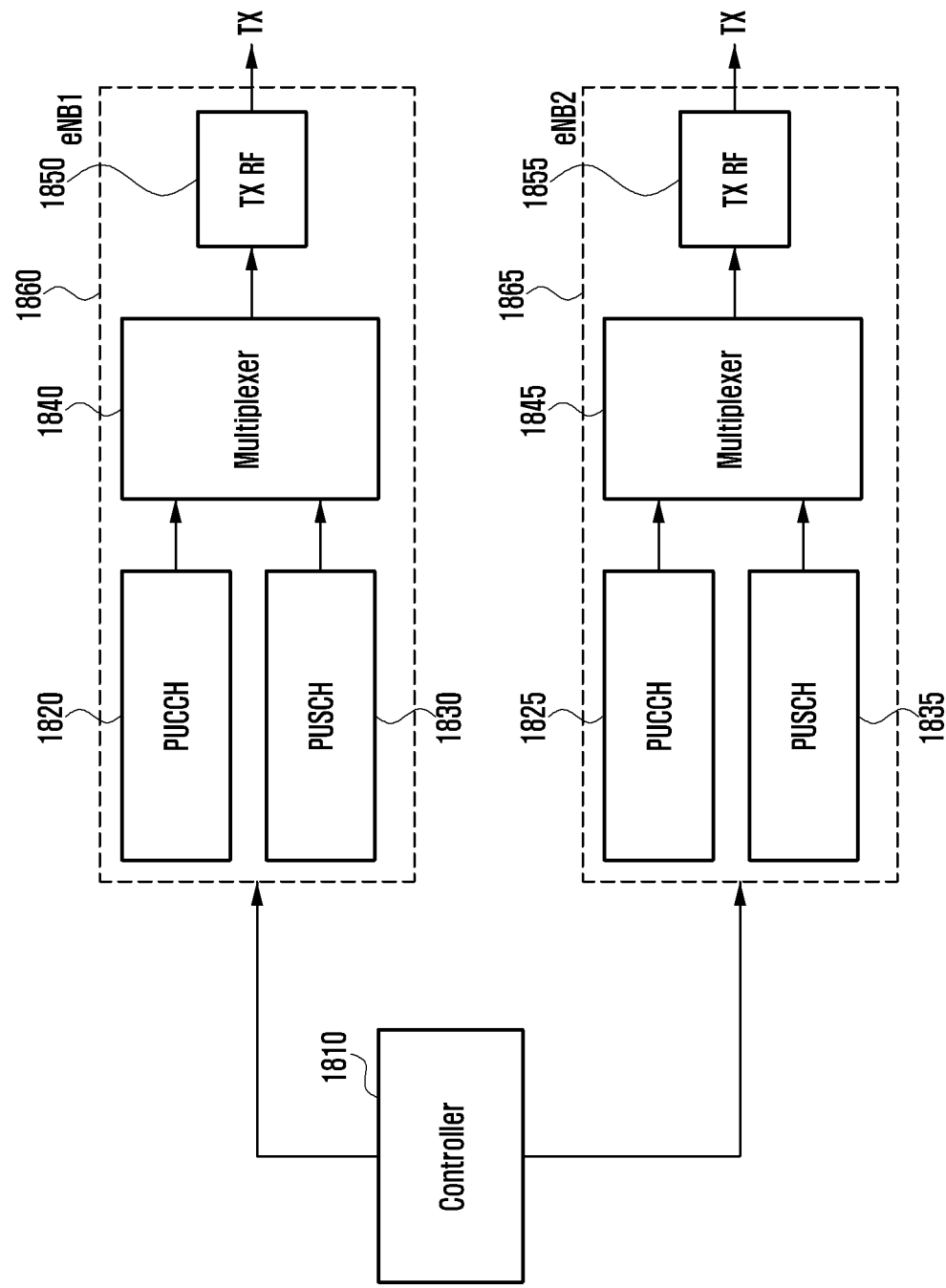
FIG. 18 is a block diagram illustrating a configuration of a UE according to an embodiment of the present invention.

FIG. 18 is a block diagram illustrating a configuration of a UE according to an embodiment of the present invention. In FIG. 18, certain well-known functions and constructions of a UE are omitted for clarity and conciseness.

Referring to FIG. 18, a UE according to an embodiment of the present invention includes a transceiver including first and second transmitters 1860 and 1865 and a controller 1810. The control unit 1810 controls the UE to perform the operations according to any of the above-described embodiments of the present invention. The first transmitter 1860 includes a first PUCCH block 1820, a first PUSCH block 1830, a first multiplexer 1840, and a first transmission Radio Frequency (RF) block 1850, for transmission to a first eNB. The second transmitter 1865 includes a second PUCCH block 1825, a second PUSCH block 1835, a second multiplexer 1845, and a second transmission RF block 1855, for transmission to the second eNB. The controller 1810 may include a control information transmission controller. The control information transmission controller controls the function blocks of the transmitters for transmitting uplink control informations of the UE based on the PDSCH and PUSCH scheduling informations received from the eNB. As described above, the control information transmission controller of the UE determines the uplink control information transmission operation depending on the cell and cell group from which the PDSCH and/or PUSCH scheduling information is received.

The first and second PUCCH blocks 1820 and 1825 of the first and second eNB-specific transmitters 1860 and 1865 perform channel coding and modulation on the uplink control information including HARQ ACK/NACKs, CSIs, etc. to generate PUCCHs. The first and second PUSCH blocks 1830 and 1835 perform channel coding and modulation on the uplink data to generate PUSCHs. At this time, the PUSCHs may be configured with respect to include uplink control information under the control of the control information transmission controller. The PUCCHs and PUSCHs generated by the first and second PUCCH blocks 1820 and 1825 and the first and second PUSCH blocks 1830 and 1835 are multiplexed by the first and second multiplexers 1840 and 1845, processed by the first and second transmission RF blocks 1850 and 1855, and then transmitted to the first and/or second eNB.

Figure 19:
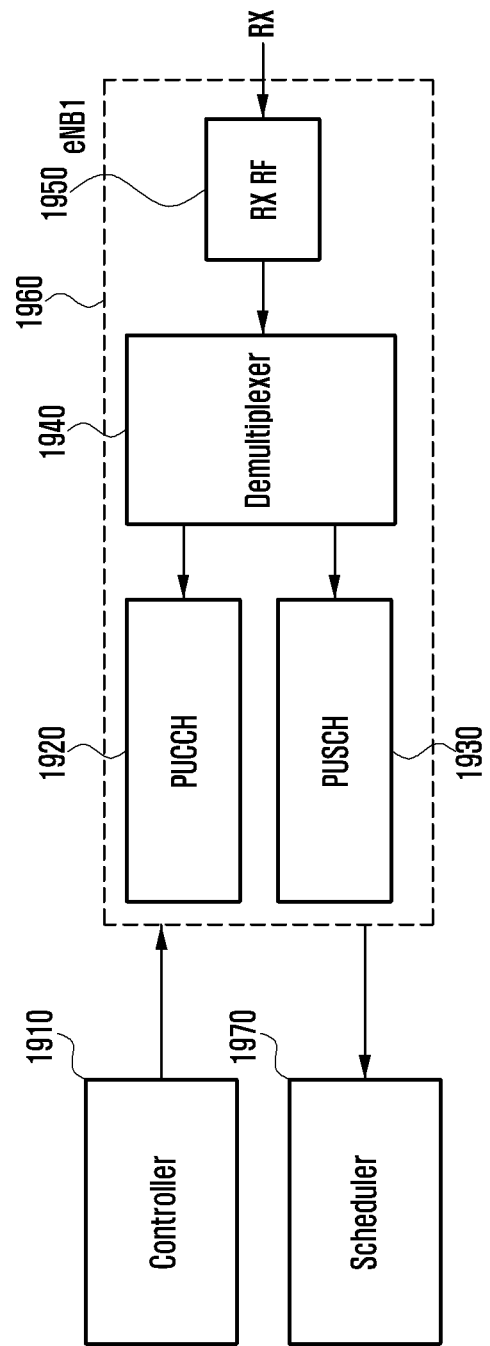
FIG. 19 is a block diagram illustrating a configuration of an eNB according to an embodiment of the present invention.

FIG. 19 is a block diagram illustrating a configuration of an eNB according to an embodiment of the present invention. In FIG. 19, certain well-known functions and constructions of an eNB are omitted for clarity and conciseness.

Referring to FIG. 19, the eNB according to an embodiment of the present invention includes a transceiver including a receiver 1960, a controller 1910, and a scheduler 1970. The controller 1910 controls the eNB to perform the operations of any of the above described embodiments of the present invention. The receiver 1960 includes a PUCCH block 1920, a PUSCH block 1930, a demultiplexer 1940, and a reception RF block 1950. The controller 1910 may include an uplink control information reception controller. The uplink control information reception controller manages the uplink control information transmission resource per UE. The uplink control information reception controller controls the reception operation of the eNB when the UE transmits uplink control information and the operations of scheduler 1970 and the function blocks of the receiver 1960. The receiver 1960 of the eNB demultiplexes the signal received from the UE by the demultiplexer 1940 and transfers the demultiplexed data to the PUSCH block 1920 and the PUSCH block 1930. The PUSCH block 1920 performs demodulation and channel decoding on the PUCCH including the uplink control information of the UE to acquire HARQ ACK/NACK, CSI, etc. The PUSCH block 1930 performs demodulation and channel decoding on the PUSCH including uplink data of the UE to acquire uplink data and uplink control information transmitted by the UE. At this time, the receiver 1960 of the eNB sends the outputs of the PUCCH and PUSCH blocks 1920 and 1930 to the scheduler 1970 and uplink control information reception controller for scheduling process.

As described above, an uplink control information transmission method according to embodiments of the present invention advantageously transmits uplink control information efficiently by use of an improved uplink control information transmission procedure and method of a UE.

While the present invention has been shown and described with reference to certain embodiments thereof, it will be understood by those skilled in the art that various changes in form and detail may be made therein without departing from the spirit and scope of the invention as defined by the appended claims and their equivalents.

What is claimed is:

1. A communication method of a terminal in a mobile communication system, the method comprising:
   receiving control information including a channel state information (CSI) request on a first subframe of a first cell;
   acquiring aperiodic CSI for the first cell;
   acquiring periodic CSI for a second cell;
   identifying whether a transmission timing of a report of the aperiodic CSI for the first cell overlaps a transmission timing of a report of the periodic CSI for the second cell;
   in response to identifying that the transmission timing of the report of the aperiodic CSI for the first cell overlaps the transmission timing of the report of the periodic CSI for the second cell, identifying whether the first cell belongs to a cell group same as the second cell or the first cell belongs to a cell group different from the second cell; and
   in response to identifying that the first cell belongs to the cell group different from the second cell, transmitting the report of the aperiodic CSI for the first cell on a second subframe of the first cell in response to the CSI request and transmitting the report of the periodic CSI for the second cell on a third subframe of the second cell, wherein the third subframe of the second cell corresponds to the second subframe of the first cell.

2. The method of claim 1, further comprising:
   in response to identifying that the first cell belongs to the cell group same as the second cell, transmitting only the report of the aperiodic CSI for the first cell on the second subframe of the first cell.

3. The method of claim 1, wherein the CSI request is not received on the first subframe of other cells except for the first cell in a first cell group to which the first cell belongs.

4. The method of claim 1, wherein transmission power for a physical uplink control channel (PUCCH) of a first cell group to which the first cell belongs is identified based on at least one of a number of information bit for CSI corresponding to the first cell group and a number of a hybrid automatic repeat request-acknowledgement (HARQ-ACK) bit corresponding to the first cell group.

5. The method of claim 1, further comprising:
   receiving first downlink data on a cell in a first cell group to which the first cell belongs;
   receiving second downlink data on a cell in a second cell group to which the second cell belongs; and
   transmitting a first feedback corresponding to the first downlink data on a PUCCH of the first cell group and transmitting a second feedback corresponding to the second downlink data on a PUCCH of the second cell group, if the first cell group and the second cell group are different cell group.

6. A terminal of a mobile communication system, the terminal comprising:
   a transceiver configured to transmit and receive data and
   a controller configured to:
      receive, via the transceiver, control information including a channel state information (CSI) request on a first subframe of a first cell,
      acquire aperiodic CSI for the first cell,
      acquire periodic CSI for a second cell,
      identify whether a transmission timing of a report of the aperiodic CSI for the first cell overlaps a transmission timing of a report of the periodic CSI for the second cell,
      in response to identifying that the transmission timing of the report of the aperiodic CSI for the first cell overlaps the transmission timing of the report of the periodic CSI for the second cell, identify whether the first cell belongs to a cell group same as the second cell or the first cell belongs to a cell group different from the second cell, and
      in response to identifying that the first cell belongs to the cell group different from the second cell, transmit, via the transceiver, the report of the aperiodic CSI for the first cell on a second subframe of the first cell in response to the CSI request and transmit, via the transceiver, the report of the periodic CSI for the second cell on a third subframe of the second cell, wherein the third subframe of the second cell corresponds to the second subframe of the first cell.

7. The terminal of claim 6, wherein the controller is further configured to transmit, via the transceiver, only the report of the aperiodic CSI for the first cell on the second subframe of the first cell in response to identifying that the first cell belongs to the cell group same as the second cell.

8. The terminal of claim 6, wherein the CSI request is not received on the first subframe of other cells except for the first cell in a first cell group to which the first cell belongs.

9. The terminal of claim 6, wherein transmission power for a physical uplink control channel (PUCCH) of a first cell group to which the first cell belongs is identified based on at least one of a number of information bit for CSI corresponding to the first cell group and a number of a hybrid automatic repeat request-acknowledgement (HARQ-ACK) bit corresponding to the first cell group.

10. The terminal of claim 6, wherein the controller is further configured to:
    receive, via the transceiver, first downlink data on a cell in a first cell group to which the first cell belongs, receive, via the transceiver, second downlink data on a cell in a second cell group to which the second cell belongs, transmit, via the transceiver, a first feedback corresponding to the first downlink data on a PUCCH of the first cell group, and transmit, via the transceiver, a second feedback corresponding to the second downlink data on a PUCCH of the second cell group, if the first cell group and the second cell group are different cell group.

* * * * *